United States Patent
Azamian et al.

(10) Patent No.: US 12,502,377 B2
(45) Date of Patent: Dec. 23, 2025

(54) METHOD OF ERADICATING TICKS THAT ATTACH TO HUMANS USING LOTILANER FORMULATIONS

(71) Applicant: Tarsus Pharmaceuticals, Inc., Irvine, CA (US)

(72) Inventors: Bobak Robert Azamian, Newport Coast, CA (US); Douglas Michael Ackermann, Reno, NV (US); Christopher Stivers, Lynnfield, MA (US); Shawn D. Hickok, Aliso Viejo, CA (US)

(73) Assignee: Tarsus Pharmaceuticals, Inc., Irvine, CA (US)

( * ) Notice: Subject to any disclaimer, the term of this patent is extended or adjusted under 35 U.S.C. 154(b) by 0 days.

(21) Appl. No.: 19/242,785

(22) Filed: Jun. 18, 2025

(65) Prior Publication Data

US 2025/0312319 A1    Oct. 9, 2025

Related U.S. Application Data

(63) Continuation of application No. 18/184,513, filed on Mar. 15, 2023, which is a continuation of application No. 17/594,144, filed as application No. PCT/IB2020/053229 on Apr. 3, 2020.

(60) Provisional application No. 62/829,573, filed on Apr. 4, 2019.

(51) Int. Cl.
| | |
|---|---|
| *A61K 31/422* | (2006.01) |
| *A61K 9/08* | (2006.01) |
| *A61K 47/26* | (2006.01) |
| *A61P 33/14* | (2006.01) |

(52) U.S. Cl.
CPC ............ *A61K 31/422* (2013.01); *A61K 9/08* (2013.01); *A61K 47/26* (2013.01); *A61P 33/14* (2018.01)

(58) Field of Classification Search
CPC ........ A61P 27/02; A61P 33/14; A61K 31/422; A61K 9/0048; A61K 9/08; A61K 47/26
See application file for complete search history.

(56) References Cited

U.S. PATENT DOCUMENTS

| | | |
|---|---|---|
| 3,781,355 A | 12/1973 | Harrison et al. |
| 3,864,497 A | 2/1975 | Harrison et al. |
| 4,389,397 A | 6/1983 | Lo et al. |
| 4,957,918 A | 9/1990 | Martin et al. |
| 5,019,392 A | 5/1991 | Wallach |
| 5,338,533 A | 8/1994 | Derrieu |
| 5,614,545 A | 3/1997 | Martin et al. |
| 5,632,999 A | 5/1997 | Miller |
| 5,747,057 A | 5/1998 | Miller |
| 5,776,481 A | 7/1998 | Karst et al. |
| 5,952,372 A | 9/1999 | McDaniel |
| 5,968,990 A | 10/1999 | Jon et al. |
| 5,981,500 A | 11/1999 | Bishop et al. |
| 6,001,822 A | 12/1999 | Wicks et al. |
| 6,063,394 A | 5/2000 | Grosse-Bley et al. |
| 6,255,350 B1 | 7/2001 | Jon et al. |
| 6,500,446 B1 | 12/2002 | Derrieu et al. |
| 6,797,701 B2 | 9/2004 | Lukas et al. |
| 6,881,726 B2 | 4/2005 | Chang et al. |
| 7,064,108 B2 | 6/2006 | Guzzo et al. |
| 7,348,317 B2 | 3/2008 | Chang et al. |
| 7,531,186 B2 | 5/2009 | Boeckh et al. |
| 7,662,972 B2 | 2/2010 | Mita et al. |
| 7,906,128 B2 | 3/2011 | Heaney et al. |
| 7,906,130 B2 | 3/2011 | Sabnis et al. |
| 7,964,204 B2 | 6/2011 | Lahm et al. |
| 8,022,089 B2 | 9/2011 | Mita et al. |
| 8,128,968 B2 | 3/2012 | Gao et al. |
| 8,138,213 B2 | 3/2012 | Mita et al. |
| 8,207,206 B2 | 6/2012 | Nicoletti et al. |
| 8,231,888 B2 | 7/2012 | Lahm et al. |
| 8,242,161 B2 | 8/2012 | Boeckh et al. |
| 8,361,974 B2 | 1/2013 | Kaoukhov et al. |
| 8,362,069 B2 | 1/2013 | Diaz-Astruc et al. |
| 8,383,659 B2 | 2/2013 | Nanchen et al. |
| 8,389,738 B2 | 3/2013 | Kousaka et al. |
| 8,450,357 B2 | 5/2013 | Soll et al. |
| 8,455,015 B2 | 6/2013 | Gao et al. |
| 8,466,115 B2 | 6/2013 | Curtis et al. |
| 8,492,311 B2 | 7/2013 | Mita et al. |
| 8,501,799 B2 | 8/2013 | Derrieu |

(Continued)

FOREIGN PATENT DOCUMENTS

| | | |
|---|---|---|
| CN | 102260252 | 11/2011 |
| CN | 102552114 A | 7/2012 |

(Continued)

OTHER PUBLICATIONS

Abd et al., "Minoxidil Skin Delivery from Nanoemulsion Formulations Containing Eucalyptol or Oleic Acid: Enhanced Diffusivity and Follicular Targeting", Pharmaceutics 2018; 10(19) in 12 pages.
Abelson et al., "Demystifying Demulcents: A look at the varieties of this common agent and how they can help soothe patients' eyes." Review of Ophthalmology 2006: pp. 1-7.
Abelson et al., "Staying Local with Blepharitis Treatment", Review of Ophthalmology, Oct. 2012, pp. 60-62.
Aldrich et al., "Ophthalmic Preparations", Stimuli to the Revision Process, 2013, 39(5): in 21 pages.
Ali et al., "Therapeutic efficacy of poly (lactic-co-glycolic acid} nanoparticles encapsulated ivermectin (nano-ivermectin} against brugian filariasis in experimental rodent model." Parasitol Res. Feb. 2014; 113(2):681-691: Abstract in 2 pages.
Allen, 2016, Ophthalmic preparations, Part 1: Ophthalmic solutions, International Journal of Pharmaceutical Compounding, 20:399-404.

(Continued)

*Primary Examiner* — Kortney L. Klinkel
*Assistant Examiner* — Richard Grant Peckham
(74) *Attorney, Agent, or Firm* — Knobbe, Martens, Olson & Bear, LLP

(57) ABSTRACT

Disclosed herein are methods of eradicating ticks that attach to a human subject, thereby preventing potential transmission of vector-borne diseases including Lyme disease, via delivery of one, two, or more systemic doses of a lotilaner anti-parasitic therapeutic agent to the subject.

29 Claims, No Drawings

(56) References Cited

U.S. PATENT DOCUMENTS

| | | |
|---|---|---|
| 8,541,413 B2 | 9/2013 | Wong et al. |
| 8,552,218 B2 | 10/2013 | Lahm et al. |
| 8,653,116 B2 | 2/2014 | Nanchen et al. |
| 8,790,674 B2 | 7/2014 | Derrieu et al. |
| 8,796,464 B2 | 8/2014 | Moriyama et al. |
| 8,815,816 B2 | 8/2014 | Manetta et al. |
| 8,871,941 B2 | 10/2014 | Lahm et al. |
| 8,921,408 B2 | 12/2014 | Soll et al. |
| 8,946,492 B2 | 2/2015 | Mita et al. |
| 8,987,218 B2 | 3/2015 | Kaoukhov et al. |
| 9,044,389 B2 | 6/2015 | Nanchen et al. |
| 9,066,515 B2 | 6/2015 | Boeckh et al. |
| 9,089,587 B2 | 7/2015 | Jacovella et al. |
| 9,095,566 B1 | 8/2015 | Yavitz et al. |
| 9,107,812 B2 | 8/2015 | Derrieu |
| 9,131,689 B2 | 9/2015 | Derrieu et al. |
| 9,173,728 B2 | 11/2015 | Wurtz |
| 9,173,870 B2 | 11/2015 | Fuchs et al. |
| 9,186,345 B2 | 11/2015 | Snorrason |
| 9,200,003 B2 | 12/2015 | Billen et al. |
| 9,233,117 B2 | 1/2016 | Jacovella et al. |
| 9,233,118 B2 | 1/2016 | Jacovella et al. |
| 9,260,231 B2 | 2/2016 | Havrileck et al. |
| 9,457,038 B2 | 10/2016 | Kaoukhov et al. |
| 9,532,978 B2 | 1/2017 | Fuchs et al. |
| 9,730,919 B2 | 8/2017 | Snorrason |
| 9,758,491 B2 | 9/2017 | Crouse et al. |
| 9,788,994 B2 | 10/2017 | Nichamin |
| 10,588,915 B2 | 3/2020 | Alster et al. |
| 10,688,122 B2 | 6/2020 | Amselem et al. |
| 10,835,517 B2 | 11/2020 | Borak |
| 11,197,847 B2 | 12/2021 | Azamian et al. |
| 11,690,826 B2 | 7/2023 | Azamian et al. |
| 11,690,827 B2 | 7/2023 | Azamian et al. |
| 11,752,137 B2 | 9/2023 | Azamian et al. |
| 12,171,750 B2 | 12/2024 | Azamian et al. |
| 12,213,964 B2 | 2/2025 | Azamian et al. |
| 12,257,263 B2 | 3/2025 | Tan et al. |
| 12,364,685 B2 | 7/2025 | Azamian et al. |
| 2003/0059382 A1 | 3/2003 | Brandt |
| 2003/0181354 A1 | 9/2003 | Abdulrazik |
| 2004/0167084 A1 | 8/2004 | Parks |
| 2006/0154901 A1 | 7/2006 | Pflugfelder et al. |
| 2007/0066617 A1 | 3/2007 | Mita et al. |
| 2008/0039519 A1 | 2/2008 | Heine |
| 2008/0089958 A1 | 4/2008 | Diehl et al. |
| 2009/0061025 A1 | 3/2009 | Gao et al. |
| 2009/0093421 A1 | 4/2009 | Kaoukhov et al. |
| 2009/0317503 A1 | 12/2009 | Adkins, Jr. |
| 2010/0266628 A1 | 10/2010 | Razzak et al. |
| 2010/0273870 A1 | 10/2010 | Gao et al. |
| 2011/0033395 A1 | 2/2011 | Kaoukhov et al. |
| 2011/0059925 A1 | 3/2011 | Donnenfeld |
| 2011/0217249 A1 | 9/2011 | Dreher |
| 2011/0274631 A1 | 11/2011 | Kaoukhov et al. |
| 2012/0053140 A1 | 3/2012 | Kaoukhov et al. |
| 2013/0023490 A1 | 1/2013 | Boeckh et al. |
| 2013/0053374 A1 | 2/2013 | Inoue et al. |
| 2013/0101655 A1 | 4/2013 | Storm et al. |
| 2013/0324538 A1 | 12/2013 | Gauvry et al. |
| 2013/0344128 A1 | 12/2013 | Gao et al. |
| 2015/0086596 A1 | 3/2015 | Spallitta |
| 2016/0184340 A1 | 6/2016 | Kritikou |
| 2016/0243116 A1 | 8/2016 | Jain |
| 2016/0256442 A1 | 9/2016 | Cady et al. |
| 2016/0287566 A1 | 10/2016 | Busby |
| 2016/0317439 A1 | 11/2016 | Lehay et al. |
| 2017/0020849 A1 | 1/2017 | Soll et al. |
| 2017/0024748 A1 | 1/2017 | Haider |
| 2017/0065565 A1 | 3/2017 | Mita et al. |
| 2017/0135978 A1 | 5/2017 | Spallitta |
| 2017/0196928 A1 | 7/2017 | McAnnally et al. |
| 2017/0232024 A1 | 8/2017 | Tan et al. |
| 2017/0239218 A1 | 8/2017 | Le Hir De Fallois et al. |
| 2017/0311601 A1 | 11/2017 | Yang et al. |
| 2020/0031859 A1 | 1/2020 | Santos et al. |
| 2020/0338105 A1 | 10/2020 | Tan et al. |
| 2021/0077465 A1 | 3/2021 | Azamian et al. |
| 2021/0077466 A1 | 3/2021 | Azamian et al. |
| 2021/0220360 A1 | 7/2021 | Kolhe et al. |
| 2022/0160682 A1 | 5/2022 | Azamian et al. |
| 2022/0249445 A1 | 8/2022 | Azamian et al. |
| 2023/0190711 A1 | 6/2023 | Azamian et al. |
| 2023/0218584 A1* | 7/2023 | Azamian .............. A61K 31/635 514/378 |
| 2024/0127762 A1 | 4/2024 | Komura et al. |
| 2025/0213602 A1 | 7/2025 | Tan et al. |

FOREIGN PATENT DOCUMENTS

| | | |
|---|---|---|
| CN | 103687594 | 3/2014 |
| EP | 2 379 537 | 10/2012 |
| EP | 3 344 611 B1 | 11/2020 |
| JP | 5246182 | 7/2013 |
| RU | 2126668 C1 | 2/1999 |
| RU | 2472505 | 1/2013 |
| WO | WO 94/015597 | 7/1994 |
| WO | WO 99/058131 | 11/1999 |
| WO | WO 04/093886 | 11/2004 |
| WO | WO 06/050837 | 5/2006 |
| WO | WO 09/024541 | 2/2009 |
| WO | WO 13/039948 | 3/2013 |
| WO | WO 16/014664 | 1/2016 |
| WO | WO 16/022066 | 2/2016 |
| WO | WO 16/073347 | 5/2016 |
| WO | WO 16/102437 | 6/2016 |
| WO | WO 16/207234 | 12/2016 |
| WO | WO 17/147352 | 8/2017 |
| WO | WO 17/178416 | 10/2017 |
| WO | WO 17/180788 | 10/2017 |
| WO | WO 17/176948 | 12/2017 |
| WO | WO 18/081733 | 5/2018 |
| WO | WO 19/126541 | 6/2019 |
| WO | WO 21/013825 | 1/2021 |
| WO | WO 21/041773 | 3/2021 |
| WO | WO 21/243014 | 12/2021 |

OTHER PUBLICATIONS

Allergan, Inc. "Restasis® (cyclosporine ophthalmic emulsion)", Product Description; Dec. 2009 1 n 7 pages.

Almasieh et al., "Structural and functional neuroprotection in glaucoma: role of galantamine-mediated activation of muscarinic acetylcholine receptors", Cell Death and Disease (2010) 1, e27; doi:10.1038/cddis.2009.23: pp. 1-11.

Alphabetic List of all veterinary anti-helminthics—Parasiteopedia Jul. 2017, in 2 pages.

American Academy of Ophthalmology [AAO] Cornea/External Disease Panel. Preferred Practice Pattern® Guidelines. Blepharitis. San Francisco, CA: American Academy of Ophthalmology; 2013. Available at: www.aao.org/ppp in 31 pages.

American Academy of Ophthalmology [AAO] Cornea/External Disease Panel. Preferred Practice Pattern® Guidelines. Blepharitis. San Francisco, CA: American Academy of Ophthalmology; 2018. Available at: www.aao.org/ppp in 38 pages.

Ames et al., "Cyclosporine ophthalmic emulsions for the treatment of dry eye: a review of the clinical evidence", Clin Investig (Lond). 2015, 5(3):267-285.

Anadón et al., "Use and abuse of pyrethrins and synthetic pyrethroids in veterinary medicine", The Vet J. 2009, 182:7-20.

Animalytix LLC. "Bimectin®—Injection for Cattle & Swine", Bimedia Inc., 2016: in 5 pages.

Anonymous (2014). "Safety Assessment of Tocopherols and Tocotrienols as Used in Cosmetics," Cosmetics Ingredient Review, Washington, DC, 39 pp.

Anonymous (1984). "Final Report on the Safety Assessment of Fossil and Synthetic Waxes," International Journal of Toxicology 3:43-99.

Anonymous (1992). "Final Report on the Safety Assessment of Methylisothiazolinone and Methylchloroisothiazlinone," Journal of the American College of Toxicology 11 :75-128.

(56) References Cited

OTHER PUBLICATIONS

Anonymous (2002). "Final Report on the Safety Assessment of EDTA, calcium disodium EDTA, diammonium EDTA, dipotassium EDTA, disodium EDTA, TEA-EDTA, tetrasodium EDTA, tripotassium EDTA, trisodium EDTA, HEDTA, and trisodium HEDTA," International Journal of Toxicology 21(Suppl. 2):95-142.
Anonymous (2013). "Amended Safety Assessment of Alkyl Esters as Used in Cosmetics," Cosmetics Ingredient Review, Washington, DC, 82 total pages.
Armstrong Rob., "The conclusion of a comparative efficacy study of fluralaner and sarolaner against the tick *Amblyomma americanum* on dogs is based on results obtained at study times that are outside the fluralaner label recommendations", Parasit Vectors. 2017, 10:159 in 2 pages.
Arrúa et al., "Comparative study of the efficacy of different treatment options in patients with chronic blepharitis", Arch Soc Esp Oftalmol. 2015, 90(3):112-118.
Asahi et al., "Differential mechanisms of action of the novel γ-aminobutyric acid receptor antagonist ectoparasiticides fluralaner (A1443) and fipronil", Pest Manag Sci. 2015, 71:91-95; Epub Mar. 31, 2014.
Asahi et al., Feb. 5, 2018, Fluxametamide: A novel isoxazoline insecticide that acts via distinctive antagonism of insect ligand-gated chloride channels, Pesticide Biochemistry and Physiology (2018), https://dot.org/10.1016/j.pestbp.2018.02.2002; Elsevier Inc.
Asbell et al., "The International Workshop on Meibomian Gland Dysfunction: Report of the Clinical Trials Subcommittee", IOVS, Special Issue 2011, 52(4):2065-2085.
Asoklis et al., "Ocular Rosacea", N Engl J Med. 2016, 374(8):771.
Australian Pesticides & Veterinary Medicines Authority; "Pastoral Ag Fluazuron pour-on tick development inhibitor for cattle", Application Summary for Application No. 104014, 2015, in 5 pages.
Australian Pesticides and Veterinary Medicines Authority [APVMA], "Safety of Fipronil in Dogs and Cats: A review of literature", 2011, pp. 1-21.
Avdeef Alex, "Solubility Temperature Dependence Predicted from 2D Structure", ADMET & DMPK 2015, 3(4):298-344.
Avila et al., 2021, Topical ivermectin-metronidazole gel therapy in the treatment of blepharitis caused by *Demodex* spp.: A randomized clinical trial, Contact Lens and Anterior Eye, 44:101326, 6 pp.
Ayres et al., "Acne Rosacea Response to Local Treatment for Demodex Folliculorum", JAMA. 1933, 100(9):645-647.
Bahmani et al., "Comparison of effect of nicotine and levamisole and ivermectin on mortality of leech", Asian Pac J Trop Dis. 2014, 4(Suppl 1):S477-S480.
Bandyopadhyay et al., 2010, Development of Ophthalmic formulations, in Nema et al., eds., Pharmaceutical Dosage forms: Parenteral Medications, Third Ed. vol. 1: Formulation and Packing, pp. 255-286.
Baranowski et al., "Ophthalmic Drug Dosage Forms: Characterization and Research Methods", Scientific World Journal, 2014, Article ID 861904 in 15 pages.
Barnhorst et al., "The Efficacy of Topical Metronidazole in the Treatment of Ocular Rosacea", Ophthalmology 1996; 103:1880-1883.
Becskei et al., "Comparative speed of kill of oral treatments with Simparica™ (sarolaner) and Bravecto® (fluralaner) against induced infestations of hipicephalus sanguineus on dogs", Parasit Vectors. 2016: pp. 1-6.
Bernigaud et al. "Efficacy and Pharmacokinetics Evaluation of a Single Oral Dose of Afoxolaner against Sarcoptes scabiei in the Porcine Scabies Model for Human Infestation", Antimicrob Agents Chemother. 2018, 62(9):e02334-17 in 12 pages.
Beugnet et al., "Comparative efficacy of two oral treatments for dogs containing either afoxolaner or fluralaner against Rhipicephalus sanguineus sensu lato and Dermacentor reticulatus" Veterinary Parasitology 209 (2015): pp. 142-145.
Beugnet et al., "Comparative speed of efficacy against Ctenocephalides felis of two oral treatments for dogs containing either afoxolaner or fluralaner", Vet Parasitol. 2015, 207: pp. 297-301.
Beugnet et al., "Insecticide and acaricide molecules and/or combinations to prevent pet infestation by ectoparasites", Trends Parasitol. 2012, 28(7):267-279.
Beugnet et al., 2016, Efficacy of oral afoxolaner for the treatment of canine generalised demodicosis, Parasite, 23:1-8.
Bezerra Da Silva et al., "Effect of Donepezil, Tacrine, Galantamine and Rivastigmine on Acetylcholinesterase Inhibition in Dugesia tigrina" Molecules 2016, 21, 53:1-11.
Biernat et al., "Occurrence of *Demodex* species in patients with blepharitis and in healthy individuals: a 10-year observational study", Japanese Ophthalmological Society, Sep. 2018, 62:628-633.
Bimeda, "Bimectin Pour-On (Ivermectin Pour-On)", Safety Data Sheet, 2015, 77(58): in 8 pages.
Bos et al., "The 500 Dalton rule for the skin penetration of chemical compounds and drugs", Exp Dermatol. 2000, 9:165-169.
Brayden et al., "Drug Delivery Systems in Domestic Animal Species", in Handbook of Experimental Pharmacology by F. Cunningham et al. (eds.), 2010; (199):79-112.
Brimecombe et al., "Electrochemical investigation of the effect of pH and solvent on amitraz stability." J Agric Food Chem. Oct. 18, 2006, 54(21):8139-8143; Abstract in 2 pages.
Bron Anthony, "Ocular rosacea", UpToDate 2016 (www.uptodate.com), Wolters Kluwer in 24 pages.
Brown, M. et al. (2014). "Severe demodex folliculorum-associated oculocutaneous rosacea in a girl successfully treated with ivermectin," JAMA Dermatol. 150:61-63.
Burgio et al., "A comparative laboratory trial evaluating the immediate efficacy of fluralaner, afoxolaner, sarolaner and imidacloprid + permethrin against adult Rhipicephalus sanguineus (sensu lato) ticks attached to dogs", Parasit Vectors. 2016, 9:626 in 6 pages.
Campbell William C., "Ivermectin as an Antiparasitic Agent for Use in Humans", Annu Rev Microbial. 1991, 45:445-474.
Cardwell et al., "New developments in the treatment of rosacea—role of once-daily ivermectin cream", Clin Cosmetic Invest Dermatol. 2016, 100(9):71-77.
Carmignani et al., 2002, Ophthalmic vehicles containing polymer-solubilized tropicamide: "in vitro/in vivo" evaluation, Drug Development and Industrial Pharmacy, 28(1):101-105.
Carson et al., "*Melaleuca alternifolia* (Tea Tree) Oil: a Review of Antimicrobial and Other Medicinal Properties" Clin Microbiol Rev. 2006, 19(1):50-62.
Casida et al., "Novel GABA receptor pesticide targets", Pest Biochem Physiol. Jun. 2015, (121):22-30.
Casida, "Golden Age of RyR and GABA-R Diamide and Isoxazoline Insecticides: Common Genesis, Serendipity, Surprises, Selectivity, and Safety", Chem Res Toxicol. 2015; 28:560-566.
Casida, "Radioligand Recognition of Insecticide Targets" J. Agric. Food Chem. 2018, 66: pp. 3277-3290.
Cavalleri et al., "A randomised, blinded, controlled field study to assess the efficacy and safety of lotilaner tablets (Credelio™) in controlling fleas in client-owned dogs in European countries" Parasit Vectors. 2017, 10:526 in 8 pages.
Cavalleri et al., "A randomized, controlled study to assess the efficacy and safety of lotilaner (Credelio™) in controlling ticks in client-owned dogs in Europe" Parasit Vectors. 2017, 10:531 in 8 pages.
Cavalleri et al., "Assessment of the onset of lotilaner (Credelio™) speed of kill of fleas on dogs" Parasit Vectors (2017) 10:521 in 5 pages.
Cavalleri et al., "Assessment of the speed of flea kill of lotilaner (Credelio™) throughout the month following oral administration to dogs", Parasit Vectors (2017) 10:529 in 8 pages.
Cavalleri et al., "Laboratory evaluations of the immediate and sustained effectiveness of lotilaner (Credelio™) against three common species of ticks affecting dogs in Europe" Parasit Vectors. 2017, 10:527 in 7 pages.
Cavalleri et al., "Two randomized, controlled studies to assess the efficacy and safety of lotilaner (Credelio™) in preventing *Dermacentor reticulatus* transmission of *Babesia canis* to dogs", Parasit Vectors. 2017, 10:520 in 7 pages.
Cavalleri et al., Jul. 13, 2018, Laboratory evaluation of the efficacy and speed of kill of lotilaner (Credelio™) against ixodes ricinus ticks on cats, Parasites & Vectors, 11:413, 10 pp.

(56) References Cited

OTHER PUBLICATIONS

CDC, Mar. 30, 2019, Lyme Disease, retrieved from the Wayback Machine on Jan. 26, 2023, https://web.archive.org/web/20190330184401/https://www.cdc.gove/lyme/index.html.
CDC. Diseases Transmitted by Ticks. Retrieved from the internet on May 8, 2023, https://www.cdc.gov/ticks/diseases/index.html#:-:text=Lyme%20disease%20is%20transmitted%20by,pacificus)%20along%20the%20Pacific%20coast. (Year: 2023).
Chavez Fernando, "Case Report of Afoxolaner Treatment for Canine Demodicosis in Four Dogs Naturally Infected with Demodex Canis" Intern J Appl Res Vet Med 2016, 14(2):123-127.
Chen et al., "Human demodicosis: revisit and a proposed classification", Br J Dermatol. 2014, 170:1219-1225.
Cheng et al., 2015, Recent advances on ocular Demodex infestation, Current Opinion in Ophthalmology, 26(4):295-300.
Cheung et al., "In vitro anti-demodectic effects and terpinen-4-ol content of commercial eyelid cleansers", Contact Lens Anterior Eye. 2018, 41:513-517.
Chhadva et al., 2017, Meibomian glad disease, American Academy of Ophthalmology, pp. S20-S26.
Chiodini et al., "Parenteral ivermectin in Strongyloides hyperinfection", The Lancet. 2000, 335:43-44.
Clark et al., "Long-term delivery of ivermectin by use of poly(D,L-lactic-co-glycolic)acid microparticles in dogs", AJVR, 2004, 65(6):752-757.
Cliradex® Blepharitis Kit, available at https://cliradex.com/product/cliradex-blepharitis-kit/ (accessed Apr. 4, 2022) 6 pp.
Cliradex® Towelettes Patient Brochure, CX-003 Rev D, Mar. 9, 2016, available at https://cliradex.com/wp-content/uploads/2019/12/cliradex-instructions-for-use.pdf (accessed Apr. 4, 2022) 1 p.
Collett et al., Jun. 2, 2016, Dosage regimens, retrieved from the internet on Jul. 5, 2024, https://basicmedicalkey.com/dosage-regimens/, 7 pp.
Čolović et al., "Acetylcholinesterase Inhibitors: Pharmacology and Toxicology" Current Neuropharmacology, 2013, 11(3):315-335.
Corta et al., "Kinetics and mechanism of amitraz hydrolysis in aqueous media by HPLC and GC-MS." Talanta. 1999, 48(1):189-99; Abstract in 1 page.
Cosmetic Ingredient Report Expert Panel Meeting (2010). Cosmetic Ingredient Review, 29 total pages.
Costa et al., "Alpha 2-adrenoceptors as a target for formamidine pesticides: in vitro and in vivo studies in mice." Toxicol Appl Pharmacol. 1988, 93(2):319-28, Abstract in 2 pages.
Costa et al., "Ivermectin for spasticity in spinal-cord injury" The Lancet 1994, 343:739.
Cresswell James E., "A meta-analysis of experiments testing the effects of a neonicotinoid insecticide (imidacloprid) on honey bees", Ecotoxicology Nov. 16, 2010 in 9 pages.
Crosaz et al., "Open field study on the efficacy of oral fluralaner for long-term control of flea allergy dermatitis in client-owned dogs in Ile-de-France region", Parasit Vectors . . . 2016, 9:174 in 5 pages.
Dadzie et al., "Ocular findings in a double-blind study of ivermectin versus diethylcarbamazine versus placebo in the treatment of onchocerciasis", Br J Ophthalmol. 1987, 71:78-85.
De Oliveira et al., "Toxicity effect of the acaricide fipronil in semi-engorged females of the tick *Rhipicephalus sanguineus* (Latreille, 1806) (Acari: Ixodidae): Preliminary determination of the minimum lethal concentration and LC50", Exper Parasitol. 2011, 127:418-422.
De Sole et al., "Adverse reactions after large-scale treatment of onchocerciasis with ivermectin: combined results from eight community trials", WHO Bulletin, 1989, 67(6):707-719.
De Sole et al., "Lack of adverse reactions in ivermectin treatment of onchocerciasis" The Lancet, 1990, 335:1106-1107.
Declaration of Bobak Robert Azamian under 37 C.F.R. § 1.132, dated Sep. 14, 2021 in U.S. Appl. No. 17/193,453, 6 pp.
Del Pino et al., "Molecular Mechanisms of Amitraz Mammalian Toxicity: A Comprehensive Review of Existing Data" Chem. Res. Toxicol. 2015, 28:1073-1094.

Do, et al., Setting of ADI for MRLs establishment of insecticide fluxametamide, URL: http://www.dbpia.co.kr/Article/NODE027269043; The 59th Biannual Conference of the Korean Society of Analytical Sciences, Nov. 2017, p. 154 (1 page).
Doan et al., "The efficacy of avermectins (ivermectin, doramectin and abamectin) as treatments for infestation with the tick *Haemaphysalis longicornis* on rabbits in Korea", Vet Parasitol. 2013, 198:406-409.
Dorati et al., "Stability Evaluation of Ivermectin-Loaded Biodegradable Microspheres", AAPS Pharm Sci Tech, 2015, 16(5):1129-1139.
Doshi et al., "Effect of Viscosity, Surface Tension and Mucoadhesion on Ocular Residence Time of Lubricant Eye Drops" Invest Ophthal Visual Science. Apr. 2009, 50:4641; ARVO Annual Meeting Abstract in 2 pages.
Dourmishev et al., "Ivermectin: pharmacology and application in dermatology", Intern J Dermatol. 2005, 44:981-988.
Drugbank, "Levamisole"—Accession No. DB00848 (APRD01067)—DrugBank, 2017, in 10 pages.
DRUGS.com, "Ivermectin", Monograph for Professionals, Am Society of Health-Sys Pharmacists, Inc. [AHFS DI Essentials] 2013, in 19 pages.
DRUGS.com, "Metronidazole", Monograph for Professionals, Am Society of Health-Sys Pharmacists, Inc. [AHFS] 2007 in 36 pages.
DRUGS.com. Credelio (lotilaner). Retrieved from the internet on May 8, 2023, https://www.drugs.com/vet/credelio-lotilaner.html. Published Sep. 2019. (Year: 2019).
Dryden et al., "Evaluation of fluralaner and afoxolaner treatments to control flea populations, reduce pruritus and minimize dermatologic lesions in naturally infested dogs in private residences in west central Florida USA", Parasit Vectors. 2016, 9:365 in 11 pages.
Dryden et al., "Efficacy of fluralaner flavored chews (Bravecto®) administered to dogs against the adult cat flea, Ctenocephalides felis felis and egg production", Parasit Vectors . . . 2015, 8:364 in 7 pages.
Durvet, "Ivermectin Injection", Bimeda-MTC Animal Health Inc., Material Safety Data Sheet, ANADA 200-447, 2011, in 6 pages.
Durvet, "Ivermectin Sheep Drench", Material Safety Data Sheet, First Priority Inc. Jun. 2, 2002,in 3 pages.
Egeberg et al., "Patients with Rosacea Have Increased Risk of Dementia", Ann Neurol. 2016, 79(6):921-928.0.
Eizadi-Mood et al., "Amitraz Poisoning Treatment: Still Supportive?" Iranian J Pharma Res. 2011, 10 (1):155-158.
Elston, "Demodex mites: facts and controversies." Clin Dermatol 2010; 28(5):502-504 [Abstract].
Environmental Protection Agency [EPA], Amitraz R.E.D. Facts Sheet EPA-738-F-96-031, 1996, in 11 pages.
Environmental Protection Agency [EPA], "Carbaryl" Summary (1992): pp. 1-4.
Environmental Protection Agency [EPA], "Fipronil—Environmental Impact Summary for DP Barcode D338854", (2007): pp. 1-71.
Environmental Protection Agency [EPA], Fipronil—New Pesticide Fact Sheet CAS #120068-37-3; (1996): pp. 1-10.
Environmental Protection Agency [EPA], "Margosan-O", Azadirachtin Summary and Registration for Vikwood Ltd. (1984): pp. 1-11.
Environmental Protection Agency [EPA], 1996, "Amitraz Approval Summary", in 182 pages.
Erdemir et al., "*Demodex* mites in acne rosacea: reflectance confocal microscopic study", Australas J Dermatol. 2017, 58(2):e26-e30.
Estermann et al., "Effect of Oral Donepezil on Intraocular Pressure in Normotensive Alzheimer Patients" J Ocular Pharma Thera. 2006, 22(1):62-67.
Ethiopia Sheep and Goat Productivity Improvement Program (ESGPIP), "Control of External Parasites of Sheep and Goats" Technical Bulletin No. 41 , 2010: pp. 1-16.
European Medicines Agency [EMA]—Committee for Human Medicinal Products (CHMP/463/00 Rev. 1), "Background review for the excipient propylene glycol", Summary of Propylene Glycol Excipient, EMA. Nov. 2014, in 96 pages.
European Medicines Agency [EMA]—Veterinary Medicines and Inspections; "Fluazuron—Summary Report", European Medicines Agency; EMEA/CVMP/77290/05-Final; 2005 in 5 pages.

(56) References Cited

OTHER PUBLICATIONS

European Medicines Agency [EMA]—Veterinary Medicines Division, "CVMP assessment report for Bravecto for spot-on solution for dogs and cats (EMEA/V/C/002526/X/0005)"; Mar. 18, 2016: pp. 1-34.
European Medicines Agency [EMA], "European public MRL assessment report (EPMAR)—Fluralaner (poultry)", Feb. 15, 2017: pp. 1-12.
European Medicines Agency [EMA]-Veterinary Medicines Division, "CVMP Assessment Report for NexGard", Committee for Medicinal Products for Veterinary Use (CVMP), Dec. 12, 2013, in 21 pages.
European Medicines Agency [EMA]-Veterinary Medicines Division, "CVMP Assessment Report for Simparica", Committee for Medicinal Products for Veterinary Use (CVMP), Sep. 10, 2015, in 26 pages.
European Medicines Agency [EMA]-Veterinary Medicines Evaluation Unit, "Cymiazole", Committee for Veterinary Medical Products, Summary Report, Mar. 1996 in 7 pages.
European Union [EU], "Directive 98/8/EC concerning the placing of biocidal products on the market—Imidacloprid", Assessment Report, Feb. 18, 2011, in 131 pages.
Farkouh et al., "Systemic side effects of eye drops: a pharmacokinetic perspective" Clin Ophthalmol. 2016, 10:2433-2441.
FDA Center for Veterinary Medicine, "Animal Drug Safety Communication: FDA Alerts Pet Owners and Veterinarians About Potential for Neurologic Adverse Events Associated with Certain Flea and Tick Products" dated Aug. 5, 2019 and updated Apr. 22, 2019; https://www.fda.gov/animal-veterinary/cvm-updates/animal-drug-safety-communication-fda-alerts-pet-owners-and-veterinarians-about-potential-neurologic (3 pages).
Federal Drug Administration [FDA], "Afoxolaner, Fluralaner and Sarolaner", FDA-CVM FOIA Response 2017-963: pp. 1-26.
Filho et al., "The efficacy of oral ivermectin for the treatment of chronic blepharitis in patients tested positive for *Demodex* spp.", Br J Ophthalmol. Jun. 2011, 95(6): 893-895.
Fisara et al., "A randomized controlled trial of the efficacy of orally administered fluralaner (Bravecto™) against induced *Ixodes holocyclus* (Australian paralysis tick) infestations on dogs", Parasit Vectors . . . 2015, 8:257 in 6 pages.
Fisara et al., "A small-scale open-label study of the treatment of canine flea allergy dermatitis with fluralaner", Vet Dermatol. 2015, 26: pp. 417-e98.
Flajs et al., "Ivermectin Pharmacokinetics", Slov Vet Res 2002; 39(3/4):167-178.
Fluralaner—Bravecto—for veterinary use in Dogs and Cats against fleas and ticks (Jul. 11, 2017), Retrieved from: http://parasilipedia.net/index.php?option=com content&view=article&id=2731&Itemid=2955, in 3 pages.
Folz et al., "Clinical evaluation of Amitraz as a treatment for canine demodicosis" Vet Parasit. 1984, 16:335-341.
Folz et al., "Evaluation of a topical treatment, alone and in combination with a detergent, for generalized demodicosis" Vet Parasitol., 1984/85, 17:165-172.
Food & Drug Administration [FDA] Veterinary Freedom of Information Summary "Nexgard—Afoxolaner", 2013, in 22 pages.
Food & Drug Administration [FDA], "21-169_Reminyl_medr_P4", 2001, Part 4, Medical Review, retrieved from URL: https://www.accessdata.fda.gov/drugsatfda_docs/nda/2001/21-169_Reminyl_medr_P4.pdf.
Food And Drug Administration [FDA], "Bravecto", Freedom of Information Summary NADA 141-426, May 15, 2014; in 39 pages.
Food And Drug Administration [FDA], CFR 21, vol. 5, Part 349 "Ophthalmic Drug Products for over-the-counter human use", [Revised as of Apr. 1, 2016] in 9 pages.
Forton et al., "Demodex folliculorum and topical treatment: acaricidal action evaluated by standardized skin surface biopsy.", Br J Dermatol. Mar. 1998, 138(3):461-466 [Abstract].
Foster et al., 2017, "Fipronil (Frontline Top Spot)", Information on Use Sheet, etc. in 2 pages.
Foster et al., Jun. 20, 2017, "The Use of Fipronil (Frontline Top Spot) in Dogs and Cats", from www.peteducation.com in 4 pages.
Foulks et al., [Eds.], "Special Issue—International Dry Eye Workshop (DEWS) Report", The Ocular Surface, Apr. 2007, 5(2):59-142.
Fourie et al., "Efficacy of a novel formulation of metaflumizone plus amitraz for the treatment of sarcoptic mange in dogs" Vet Parasitol. 2007, 150:275-281.
Fourie et al., "Efficacy of a topical application of Certifect (fipronil 6.26% w/v, amitraz 7.48% w/v, (S)-methoprene 5.63% w/v) for the treatment of canine generalized demodicosis" Parasite 2013, 20:46 in 6 pages.
Fourie et al., "Efficacy of orally administered fluralaner (Bravecto™) or topically applied imidacloprid/moxidectin (Advocate®) against generalized demodicosis in dogs" Fourie et al. Parasit Vectors., 2015, 8:187 in 7 pages.
Frame et al., "Comparing the in vitro effects of MGO™ Manuka honey and tea tree oil on ocular *Demodex* viability" Contact Lens Anterior Eye 2018, 41(6):527-530.
G Production Inc., Oct. 2011, Metrogel® (metronidazole) Gel: Highlights of Prescribing Information in 2 pages.
Galderma Laboratories, LP., "Soolantra™ (ivermectin) cream", Highlights of Prescription Information: Dec. 2014, in 8 pages.
Gao et al., "Clinical Treatment of Ocular Demodicosis by Lid Scrub With Tea Tree Oil", Cornea, Mar. 2007, 26:136-143.
Gao et al., "High Prevalence of Demodex in Eyelashes with Cylindrical Dandruff" Invest Ophthalmol Vis Sci. 2005; 46(9):3089-3094.
Gao et al., "In vitro and in vivo killing of ocular Demodex by tea tree oil" Br J Ophthalmol 2005; 89:1468-1473.
Gardon et al., "Serious reactions after mass treatment of onchocerciasis with ivermectin in an area endemic for Loa loa infection" The Lancet, 1997, 350:18-22.
Gassel et al., "The novel isoxazoline ectoparasiticide fluralaner: Selective inhibition of arthropod γ-aminobutyric acid- and L-glutamate-gated chloride channels and insecticidal/ acaricidal activity", Insect Biochem Mol Biol. 2014; 45:111-124.
Geerling et al., "The International Workshop on Meibomian Gland Dysfunction: Report of the Subcommittee on Management and Treatment of Meibomian Gland Dysfunction", IOVS, Special Issue 2011, 52(4):2050-2064.
Gibbons et al., "A review of the direct and indirect effects of neonicotinoids and fipronil on vertebrate wildlife", Environ Sci Pollut Res. 2015, 22:103-118.
Gonzalez-Salinas et al., Sep. 21, 2021, Safety and efficacy of topical lotilaner ophthalmic solution 0.25% for the treatment of demodex blepharitis: a pilot study, Journal of Ophthalmology, 2021:1-7.
Gordon D.M., "Dimethyl Sulfoxide in Ophthalmology, with Especial Reference to Possible Toxic Effects", Biol Actions of Dimethyl Sulfoxide, 1967, 141:392 in 4 pages.
Government Publishing Office, "Ophthalmic and Topical Dosage Form New Animal Drugs; Ivermectin Topical Solution", 21 CFR Part 524; FR 2011, 76(250):81806-7.
Green-Church et al., "The International Workshop on Meibomian Gland Dysfunction: Report of the Subcommittee on Tear Film Lipids and Lipid-Protein Interactions in Health and Disease" IOVS, Special Issue 2011, 52(4):1979-1993.
Grubbs Jr. et al., "Instrument Development of the UNC Dry Eye Management Scale", Cornea. Nov. 2014, 33(11):1186-1192.
Gupta et al., "Ivermectin 1% Cream for Rosacea", SkinTherapyLetter.com, Dec. 15, 2015, in 6 pages.
Gupta Ramesh C. [Ed.], "Amitraz", Vet Toxicol. 2007, Chapter 46, pp. 514-517.
Guzzo et al., "Safety, Tolerability, and Pharmacokinetics of Escalating High Doses of Ivermectin in Healthy Adult Subjects", J Clin Pharmacol. 2002, 42:1122-1133.
Hainzl et al., "Mechanisms for Selective Toxicity of Fipronil Insecticide and Its Sulfone Metabolite and Desulfinyl Photoproduct", Chem Res Toxicol. 1998, 11(12):1529-1535.
Halos et al., "Preference of Dogs between Two Commercially Available Oral Formulations of Ectoparasiticide Containing Isoxazolines, Afoxolaner or Fluralaner", Open J Vet Med. 2015, 5:25-29.
Hecht et al., Dec. 2019, Permethrin cream for the treatment of demodex blepharitis, Cornea, 38(12):1513-1518 (abstract).

(56) References Cited

OTHER PUBLICATIONS

Herath et al., "Amitraz poisoning: A case report of an unusual pesticide poisoning in Sri Lanka and literature review" BMC Pharmacol Toxicol. (2017) 18(6):1-6.
Herrero, V.R., "Preservatives in Ophthalmic Formulations: An Overview", Arch Soc Esp Oftalmol. 2007; 82(9):531-532.
Holgado et al., 2020, Contact lenses drug-delivery systems: a promising therapeutic tool, Archivos de la Sociedad Espanola de Oftalmologia (English Edition), 95(1):24-33.
Holland et al., "Lifitegrast for the Treatment of Dry Eye Disease—Results of a Phase III Trial (OP3)", Ophthalmol. Jan. 2017, 124(1):53-60.
Holzchuh et al., "Clinical Treatment of Ocular *Demodex folliculorum* by Systemic Ivermectin" Am J Ophthalmol., 2011, 151:1030-1034.
Hom et al. Randomized Controlled Trial to Evaluate the Safety and Efficacy of TP-03 for the Treatment of Blepharitis Due to Demodex Infestation (Jupiter Study—Phase 2B—Presented at AOA 2020 Virtual Meeting Jun. 26, 2020 available at https://www.tarsusrx.com/jupiter-study (accessed Jul. 13, 2020) in 3 pages.
Hom et al., "Understanding Emulsion Eye Drop Technology", Rev Optometry. Mar. 2003, 140(3)in 6 pages.
Hosseini et al., "Development and evaluation of a measure of patient-reported symptoms of Blepharitis" Health and Quality of Life Outcomes, 2018, 16:11 in 6 pages.
Inceboz et al., "Diagnosis and Treatment of Demodectic Blepharitis" Türkiye Parazitoloji Dergisi, 2009; 33 (1):p. 32-36.
Intervet Australia Pty Limited, "Bravecto Fluralaner Chewable Tablets for Dogs", Material Safety Data Sheet Feb. 2015, Version 1: pp. 1-11.
Ismailos et al., "Unusual solubility behaviour of cyclosporin A in aqueous media" J Pharm Pharmacol. 1991, 43:287-289.
Jackson Jeremy D., "Infectious folliculitis", UpToDate 2016 (www.uptodate.com) Wolters Kluwer. 2016, in 39 pages.
Jacobi et al., Prevalence of Demodex Follicularum in patients with keratoconjunctivitis sicca, TFOS 2016 poster in 2 pages.
Jańczak et al., "Clinical aspects of demodicosis in veterinary and human medicine", Med Weter. 2017, 73(5):265-271.
Jarmuda, S. et al. (2012). Potential role of *Demodex* mites and bacteria in the induction of rosacea, J. Med. Microbial. 61 (Pt. 11):1504-1510.
Jarmuda, S. et al. (2014). "Correlation between serum reactivity to Demodex-associated Bacillusoleronius proteins, and altered sebum levels and Demodex populations in erythematotelangiectaticrosacea patients," J. Med. Microbial. 63(Pt. 2):258-262.
Jelic et al., "Donepezil: A Review of Pharmacological Characteristics and Role in the Management of Alzheimer Disease" Clin Med Insights: Therapeutics 2010, 2:771-788.
Jia et al., "Acute Toxicity, bioconcentration, elimination and antioxidant effects of fluralaner in zebrafish *Danio rerio*", Environ Pollut. 2018, 232:183-190; Epub Sep. 15, 2017.
Jiang et al., "Mosquitocidal Activity and Mode of Action of the Isoxazoline Fluralaner", Int J Environ Res Public Health. 2017, 14:154 in 17 pages.
Johnson, W. (2011). "Safety Assessment of Cyclomethicone, Cyclotetrasiloxane, Cyclopentasiloxane, Cyclohexasiloxane, and Cycloheptasiloxane," International Journal of Toxicology 30(Suppl. 3):149S-227S.
Jon et al., "Liquid matrices for insecticides for "pour on" applications in aqueous medium—Amitraz As A Case Study", in *Pesticide Formulations and Application Systems: Eighteenth Volume, ASTM STP 1347* [Nalewaja et al.—Eds.] 1998, pp. 228-241.
Jongejan et al., "Comparative efficacy of oral administrated afoxolaner (NexGard™) and fluralaner (Bravecto™) with topically applied permethrin/imidacloprid (Advantix®) against transmission of Ehrlichia canis by infected *Rhipicephalus sanguineus* ticks to dogs", Parasit Vectors. 2016, 9:348 in 14 pages.

Jonsson et al., "Critical evaluation of the modified-adult immersion test with discriminating dose bioassay for Boophilus microplus using American and Australian isolates" Vet Parasitol. 2007, 146:307-315.
Junquera P., "Fluralaner: Safety Summary for Veterinary use in Dogs & Cats (Bravecto)", 2017 in 3 pages.
Kabat Alan G., "In-Vitro Demodicidal Activity of Commercial Lid Hygiene Products" Southern College of Optometry. (2018) Poster in 1 page.
Kagaruki, "The efficacy of amitraz against cattle ticks in Tanzania" Onderstepoort J Vet Res. 1996, 63:91-96.
Karadzovska et al., "A randomized, controlled field study to assess the efficacy and safety of lotilaner flavored chewable tablets (Credelio™) in eliminating fleas in client-owned dogs in the USA", Parasit Vectors. 2017, 10:528 in 9 pages.
Kaushik et al., "Acetylcholinesterase Inhibitors: Beneficial Effects on Comorbidities in Patients With Alzheimer's Disease" Am J Alzheimer's Dis Other Demen. 2018, 33(2):73-85; Epub Oct. 3, 2017 in 13 pages.
Kheirkhah et al., "Fluorescein Dye Improves Microscopic Evaluation and Counting of *Demodex* in Blepharitis With Cylindrical Dandruff" Cornea 2007;26:697-700.
Kilp et al., "Comparative pharmacokinetics of fluralaner in dogs and cats following single topical or intravenous administration", Parasit Vectors. 2016; 9(296) in 7 pages.
Kilp et al., "Pharmacokinetics of fluralaner in dogs following a single oral or intravenous administration" Parasit Vectors 2014, 7:85: pp. 1-5.
Kita et al., "Amitraz and its metabolite differentially activate α- and β-adrenergic-like octopamine receptors." Pest Manag Sci. 2017; 73(5):984-990, Abstract in 2 pages.
Kita et al., "Pharmacological characterization of histamine-gated chloride channels from the housefly *Musca domestica*", Neurotoxicology 60 (2017): pp. 245-253.
Knop et al., "The International Workshop on Meibomian Gland Dysfunction: Report of the Subcommittee on Anatomy, Physiology, and Pathophysiology of the Meibomian Gland", IOVS, Special Issue 2011, 52(4):1938-1978.
Kojima et al., "In Vivo Evaluation of Ocular Demodicosis Using Laser Scanning Confocal Microscopy", Invest Ophthalmol Visual Science. Jan. 2011, 52(1): 565-569.
Kong et al., "Absolute configuration assignment of (+)-fluralaner using vibrational circular dichroism" Chirality. 2017, 29:854-864.
Kong et al., "Solubility of Imidacloprid in Different Solvents", J Chem Eng Data, 2008, 53:615-618.
Kono et al., 2022, State-dependent inhibition of GABA receptor channels by the ectoparasiticide fluralaner, Pesticide Biochemistry and Physiology, 181,:105008.
Koo et al., "Ocular Surface Discomfort and Demodex: Effect of Tea Tree Oil Eyelid Scrub in Demodex Blepharitis", J Korean Med Sci 2012; 27:1574-1579.
Kugadas et al., "Impact of Microbiome on Ocular Health", The Ocular Surface, Jul. 2016, 14(3):342-349.
Kuntz et al., "Safety evaluation of lotilaner in dogs after oral administration as flavoured chewable tablets (Credelio™)", Parasit Vectors. 2017, 10:538 in 6 pages.
Lacey et al., "*Demodex* Mites—Commensals, Parasites or Mutualistic Organisms?" Dermatology 2011; 222:128-130.
Lacey et al., "Mite-related bacterial antigens stimulate inflammatory cells in rosacea", Br J Dermatol. 2007, 157(3):474-481.8.
Lacey et al., "Study of *Demodex* mites: Challenges and Solutions" JEADV 2016, 30:764-775.
Lacey et al., "Under the lash: *Demodex* mites in human diseases" Biochem (Lond) 2009 31(4):2-6.
Laspina et al., "*Demodex* ssp en pacientes con blefaritis crónica", Rev Chilena Infectol 2015; 32 (1):37-42.
Lee et al., 2015, Comparison of cytotoxicity and wound healing effect of carboxymethylcellulose and hyaluronic acid on human corneal epithelial cells, Int. J. Ophthalmot. 8(2):215-221.
Leinart, 2017, Comparison of efficacy, side effects, and cost of isoxasolines and ivermectin against generalized canine demodicosis, Bachelor's thesis, University of Arizona, 8 pp.

(56) References Cited

OTHER PUBLICATIONS

Lemp et al., "Blepharitis in the United States 2009: A Survey-based Perspective on Prevalence and Treatment" The Ocular Surface, Apr. 2009, 7(2):S1-22.

Letendre et al., 2014, The intravenous and oral pharmacokinetics of afoxolanerused as a monthly chewable antiparasitic for dogs, Veterinary Parasitology, 201:190-197.

Lexicomp, Inc. 2016, Ivermectin (systemic): Drug information, www.uptodate.com, 6 pp.

Li, J. et al. (2010). "Correlation between ocular Demodex infestation and serum immunoreactivity to Bacillus proteins in patients with Facial rosacea," Ophthalmology 117:870-877.

Liang et al., "High Prevalence of *Demodex brevis* Infestation in Chalazia" Am J Ophthalmol 2014, 157:342-348.

Lifschitz et al., "Comparative distribution of ivermectin and doramectin to parasite location tissues in cattle", Vet Parasitol. 2000, 87:327-338.

Lilienfeld Sean, "Galantamine—a Novel Cholinergic Drug with a Unique Dual Mode of Action for the Treatment of Patients with Alzheimer's Disease" CNS Drug Reviews, 2002, 8(2):159-176.

Lindsley et al., "Interventions for chronic blepharitis", Cochrane Database Syst Rev. Dec. 2014, 5:e in PMC Dec. 18, 2014, CD005556. doi:10.1002/14651858.CD005556.pub2; in 117 pages.

Little Susan E., "Lotilaner—a novel systemic tick and flea control product for dogs", Parasit Vectors. 2017, 10:539 in 3 pages.

Liu et al., "Pathogenic role of *Demodex* mites in blepharitis", Curr Opin Allergy Clin Immunol. Oct. 2010, 10(5):505-510.

Lo Re et al., Apr. 15, 2004, Identifying the vector of Lyme disease, Am Fam Physician, 69(8), 3 pp.

Lu, G.W., "Recent advances in developing ophthalmic formulations: a patent review", Recent Pat Drug Deliv Formul. Jan. 2010, 4(1):49-57; Abstract in 1 page.

Luntz et al., "Azadirachtin from the Neem Tree *Azadirachta indica*: its Action Against Insects" An. Soc. Entomol. Brasil. 2000, 29(4):615-632.

Mabrouk St. The Preparation and Testing of a Common Emulsion and Personal Care Product: Lotion. Journal of Chemical Education vol. 81, No. 1, p. 83-86, 2004. (Year: 2004).

Maier, "Management of rosacea" UpToDate 2016 (www.uptodate.com), Wolters Kluwer, in 28 pages.

Marty et al., "Treatment of Human Disseminated Strongyloidiasis with a Parenteral Veterinary Formulation of Ivermectin", Clin Infect Diseases. 2005, 41: e5-8.

Matricoti et al., "The use of oral fluralaner for the treatment of feline generalized demodicosis: a case report" Journal of Small Animal Practice (2017) 58, pp. 476-479.

Mayo Clinic, 2022, Blepharitis, https://www.mayoclinic.org/diseases-conditions/blepharitis/symptoms-causes/syc-20370141.

Mckellar et al., "Clinical and pharmacological properties of ivermectin in rabbits and guinea pigs", The Veterinary Record. 1992, 130(4):71-73; Abstract in 2 pages.

Mctier et al., "Discovery of sarolaner: A novel, orally administered, broad-spectrum, isoxazoline ectoparasiticide for dogs", Vet Parasitol. 2016, 222:3-11.

Meadows et al., "A randomized, blinded, controlled USA field study to assess the use of fluralaner tablets in controlling canine flea infestations", Parasit Vectors. 2014, 7:375 in 8 pages.

Medisca Inc., "Doxycycline Hyclate USP—Safety Data Sheet", Jul. 2014, in 6 pages.

Medvedev et al., "Clinical-Laboratory Parallels in Patients with Demodectic Blepharitis at Cosmecevtic's Use", Ophthalmology 2015: 12 (4):50-57.

Merck & Co., Inc., "Stromectol® (Ivermectin) Tablets", Prescription Information, May 2010, in 7 pages.

Merck Animal Health, "Compendium of Veterinary Products—Bravecto@ (fluralaner topical solution) for Dogs," dated Aug. 5, 2019: https://merckusa.cvpservice.com/product/basic/view/1047520 (4 pages).

Merck, "Pyrethrins and Synthetic Pyrethroids" Retrieved from: http://www.merckvetmanual.com/pharmacology/ectoparasiticides/ectoparasiticides-used-in-large-animals, downloaded Dec. 11, 2017 in 1 page.

Merial Ltd., "Ivermectin-IVOMEC Injection for Cattle and Swine", Material Safety Data Sheet; Jan. 7, 2010, in 7 pages.

Merial Ltd., "NexGard (afoxolaner) Chewables", Safety Data Sheet 2014, in 5 pages.

Merial Ltd., "NexGard (afoxolaner) Chewables", Technical Monograph, 2014, in 21 pages.

Merriam-Webster. Prevent. Retrieved from the internet on May 11, 2023, https://www.merriam-webster.com/dictionary/prevent. (Year:2023).

Miglianico et al., Repurposing isoxazoline veterinary drugs for control of vector-borne human diseases; PNAS; vol. 115, No. 29, pp. E6920-E6926 (6 pages). URL: www.pnas.org/cgi/doi/10.1073/pnas.1801338115.

Missel et al., "Design and Evaluation of Ophthalmic Pharmaceutical Products", in *Modern Pharmaceutics; 5th Edition (2009)*—Ophthalmic Formulations Guide Chapter 4, pp. 101-189.

Miyajima et al., "Effect of high fat intake on the pharmacokinetic profile of ivermectin in rabbits" Drug Metabolism and Pharmacokinetics 30 (2015): pp. 253-256.

Moser VC., "Amitraz" Encyclopedia of Toxicology, vol. 1, 2014, pp. 200-202.

Mueller et al., "Treatment of canine generalized demodicosis with a 'spot-on' formulation containing 10% moxidectin and 2.5% imidacloprid (Advocate, Bayer Healthcare)", Vet Dermatol. 2009, 20:441-446.

Mueller et al., "Treatment of demodicosis in dogs: 2011 clinical practice guidelines", Vet Dermatol. 2012, 23:86-e21 in 13 pages.

Mueller Ralf S., "Treatment protocols for demodicosis: An evidence-based review", Vet Dermatol. 2004, 15:75-89.

Mullen et al., [Eds.] "Mites (*Acari*)" in *Medical and Veterinary Entomology*, Academic Press, 2009, 2nd Edition, Chapter 26, p. 549.

Mullens et al., "Comparative in vitro evaluation of contact activity of fluralaner, spinosad, phoxim, propoxur, permethrin and deltamethrin against the northern fowl mite, *Ornithonyssus sylviarum*", Parasit Vectors. 2017; 10:358 in 7 pages.

Murphy et al., "Laboratory evaluations of the immediate and sustained efficacy of lotilaner (Credelio™) against four common species of ticks affecting dogs in North America", Parasit Vectors. 2017, 10:523 in 8 pages.

Murphy et al., 2017, Laboratory evaluation of the speed of kill of lotilaner (Credelio™) against *Ixodes ricinus* ticks on dogs, Parasit Vectors, 10:541, 8 pp . . . .

Narayanan et al., "Use of Carbodiimides as Stabilizing Agents to Deliver Water-Labile Active Ingredients in Liquid Systems Including Aqueous Medium-Amitraz as a Case Study", J ASTM Inter'l., Feb. 2006, 3(2): pp. 1-7.

Nashat et al. "Characterization of Demodex musculi Infestation, Associated Comorbidities, and Topographic Distribution in a Mouse Strain with Defective Adaptive Immunity", Compara Med. 2017, 67(4):315-329.

Nau, Jeffrey. "Oyster Point Pharma", Apr. 12, 2018. PowerPoint in 15 pages.

Nelson et al., "The International Workshop on Meibomian Gland Dysfunction: Report of the Definition and Classification Subcommittee", IOVS, Special Issue. 2011, 52(4):1930-1937.

Ng, Keng Wooi., "Penetration Enhancement of Topical Formulations", Pharmaceutics 2018; 10(51) in 3 pages.

Nicholls et al., "*Demodex* species in human ocular disease: new clinicopathological aspects." Int Ophthalmol. Epub May 9, 2016, (Abstract) in 2 pages.

Nicholls et al., "Demodex treatment in external ocular disease: the outcomes of a Tasmanian case series", Springer Science+Business Media Dordrecht, Int Ophthalmol. 2016, 6 pages.

Nichols et al., "The International Workshop on Meibomian Gland Dysfunction: Executive Summary", IOVS, Special Issue 2011, 52(4):1922-1929.

(56) References Cited

OTHER PUBLICATIONS

Nichols Kelly K., "The International Workshop on Meibomian Gland Dysfunction: Introduction", IOVS, Special Issue 2011, 52(4):1917-1921.
Ohmes et al., "Comparative Efficacy of an Imidacloprid/Flumethrin Collar (Seresto®) and an Oral Afoxolaner Chewable (NexGard®) against Tick (*Dermacentor variabilis* and *Amblyomma americanum*) Infestations on Dogs: a Randomised Controlled Trial", Parasitol Res. 2015, 114(Suppl 1):S81-94.
Omura et al., "The life and times of ivermectin—a success story", Perspectives, Dec. 2004, 2:984-989.
Ozoe et al., "The antiparasitic isoxazoline A1443 is a potent blocker of insect ligand-gated chloride channels", Biochem Biophys Res Comm. 2010, 391:744-749.
Pacque et al., "Safety of and compliance with community-based ivermectin therapy", The Lancet, 1990, 335:1377-1380.
Padula et al., "Assessment of the adverse effects of the acaricide amitraz: in vitro evaluation of genotoxicity", Toxicol Mech Methods., 2012; 22(9):657-661.
Palopoli et al., "Global divergence of the human follicle mite *Demodex folliculorum*: Persistent associations between host ancestry and mite lineages" PNAS, Dec. 2015, 112(52):15958-15963.
Panic et al., "Repurposing drugs for the treatment and control of helminth infections", Int J Parasitol Drugs Drug Resist. 2014, 4(3):185-200.
Pass et al., "Pharmacokinetics and metabolism of amitraz in ponies and sheep." J Vet Pharmacol Ther. Jun. 1995; 18(3):210-5, Abstract in 2 pages.
Paterson et al., "Canine generalized demodicosis treated with varying doses of a 2.5% moxidectin + 10% imidacloprid spot-on and oralivermectin: Parasiticidal effects and long-term treatment outcomes", Vet Parasitol. 2014, 205:687-696.
Pathan et al., "Chemical Penetration Enhancers for Transdermal Drug Delivery Systems", Trop J Pharm Res. Apr. 2009; 8 (2):173-179.
Pfau Wolfgang, "Azadirachtin Evaluation of Classification and Labelling Proposal with regard to Developmental Toxicity", Report #234379-A2-050601-01 Gab Consulting GmbH, 2014: pp. 1-15.
PILULI.RU Internet Pharmacy, "Demazol" Instruction Manual, piluli.ru; 2016, in 5 pages.
Powell Frank C., "Rosacea", N Engl J Med. 2005, 352(8):793-803.
PR Newswire, "Elanco Animal Health Announces U.S. Food and Drug Administration {FDA} Approval of Credelio® {lotilaner) to Treat and Protect Against Ticks and Fleas", PRNewswire, 2018, in 4 pages.
Price et al., "An atypical residue in the pore of Varroa destructor GABA-activated RDL receptors affects picrotoxin block and thymol modulation", Insect Biochem Mol Biol. 2014, 55:19-25.
Prohaczik et al., "Safety of fluralaner oral solution, a novel systemic antiparasitic treatment for chickens, in laying hens after oral administration via drinking water", Parasit Vectors. 2017, 10:363 in 7 pages.
PubChem, Aug. 2022, Polyoxyl 35 castor oil, CID 154733643, 24 pp.
Pubchem. Fluralaner. Retrieved from the Internet on Aug. 18, 2023.8/23/2https://pubchem.ncbi.nlm.nih.gov/compound/25144319 (Year:2023).
Puthran et al., "Ivermectin treatment for massive orbital myiasis in an empty socket with concomitant scalp pediculosis", Indian J Ophthalmol. May-Jun. 2012;60(3):225-227.
Radakovic et al., "Evaluation of the DNA damaging effects of amitraz on human lymphocytes in the Comet assay", J Biosci. 2013, 38(1):53-62.
Rahman M.M., "Synthesis and Structure-Activity Relationships of Iminopyridazine Competitive Antagonists in Insect GABA Receptors", Doctorate Thesis; Tottori University 2014, in 109 pages.
Ramesh et al., "Kinetics and Hydrolysis of Fenamiphos, Fipronil, and Trifluralin in Aqueous Buffer Solutions", J Agric Food Chem. 1999, 47(8):3367-3371.

Richardson Jill A., "Amitraz", Specific Toxicants (2013), Chapter 31, Section 4: pp. 431-433.
Rios-Yu ii, J.M. et al. (2013). "Evaluation of Demodex folliculorum as a Risk Factor for the Diagnosis of Rosacea In Skin Biopsies. Mexico's General Hospital (1975-2010)," Indian J. Dermatol. 58: 157.
Robinson et al., "Selamectin versus ivermectin for cheyletiellosis in pet rabbits", in *Clinical Decision Making*; Vet Record, 2016, 178:344-345.
Rodriguez-Dehaibes et al., "Resistance to amitraz and flumethrin in *Varroa destructor* populations from Veracruz, Mexico" J Agricult Res. 2007, 44(3):68-69.
Roeder Thomas, "Pharmacology of the octopamine receptor from locust central nervous tissue (OAR3)" Br J Pharmacol. 1995, 114:210-216.
Rohdich et al., "A randomized, blinded, controlled and multi-centered field study comparing the efficacy and safety of Bravecto™ (fluralaner) against Frontline™ (fipronil) in flea- and tick-infested dogs", Parasit Vectors. 2014, 7:83, 4 pp.
Romero et al., "Efficacy of fluralaner in 17 dogs with sarcoptic mange", Vet Dermatol. 2016, 27:353-e88 in 4 pages.
Roth C. GmbH, "Carvacrol", Safety Data Sheet CAS #499-75-2; (2015): pp. 1-12.
Rufener et al., "The novel isoxazoline ectoparasiticide lotilaner (Credelio™): a non-competitive antagonist specific to invertebrates γ-aminobutyric acid-gated chloride channels (GABACIs)", Parasit Vectors. 2017, 10:530 in 15 pages.
Rufli et al., "The Hair Follicle Mites *Demodex folliculorum* and *Demodex brevis*: Biology and Medical Importance", Dermatologica 1981, 162:1-11.
Rynerson et al., "DEBS—a unification theory for dry eye and blepharitis", Clin Ophthalmol. Dec. 9, 2016, 10:2455-2467.
Sabnis et al., "Topical formulations of metaflumizone plus amitraz to treat flea and tick infestations on dogs", Veterinary Parasitology 150 (2007): pp. 196-202.
Salem, D.A. et al. (2013). "Evaluation of the efficacy of oral ivermectin in comparison with ivermectinmetronidazole combined therapy in the treatment of ocular and skin lesions of Demodex folliculorum," Int. J. Infect. Dis. 17:e343-e347.
Sánchez-Bayo, "Insecticides Mode of Action in Relation to Their Toxicity to Non-Target Organisms" J Environ Analytic Toxicol. 2011, S4:1-11.
Sanofi Pasteur Inc., "SKLICE® (ivermectin) Lotion", Highlights of Prescription Information, Feb. 2012 in 3 pages.
Santana et al., "A novel technique for improving an in vitro culture of *Demodex* spp (Acari: Demodicidae). A pilot trial." Front. Immunol. Conference Abstract: IMMUNOCOLUBIA2015—11th Congress of the Latin American Association of Immunology 2015: 2 pages.
Sattler et al., "Reflectance confocal microscopy for monitoring the density of *Demodex* mites in patients with rosacea before and after treatment", Br J Dermatol. 2015, 173:69-75.
Savla et al., 2020, Tea tree oil for Demodex blepharitis (Review), Cochrane Library, Cochrane Database of Systematic Reviews 2020, Issue 6, Art. No: CD013333, pp. 1-45.
Schaub et al., "Monitoring resistance of pear psylla Cacopsylla pyri to amitraz" Integrated Fruit Production IOBC/wprs Bulletin, 2001, 24(5):151-153.
Schaumberg et al., "Prevalence of Dry Eye Disease Among US Men", Arch Ophthalmol., 2009, 127(6):763-768.
Schaumberg et al., "The International Workshop on Meibomian Gland Dysfunction: Report of the Subcommittee on the Epidemiology of, and Associated Risk Factors for, MGD", IOVS, Special Issue 2011, 52(4):1994-2005.
Schear et al., "The Association of Demodex with Chalazia: A Histopathologic Study of the Eyelid", Ophthal Plast Reconstr Surg. 2016, 32(4):275-278.
Schneider et al., "Metrifonate: A Cholinesterase Inhibitor for Alzheimer's Disease Therapy" CNS Drug Reviews, 1999, 5(1):13-26.
Seddiek et al., "The acaricidal efficacy of aqueous neem extract and ivermectin against *Sarcoptes scabiei* var. *cuniculi* in experimentally infested rabbits", Parasitol Res. 2013, 112:2319-2330.

(56) References Cited

OTHER PUBLICATIONS

Sedzikowska et al., "Impact of Salvia and Peppermint Oil on the In Vitro Survival of *Demodex* Mites", J Bacter Parasitol. 2015, 6 (3): in 2 pages.
Sharma et al., "Antihelminthic drugs in recurrent apthous stomatitis: A short review", J Pharm Bioallied Sci. 2014, 6(2):65-68.
Sheng et al., "Insecticidal spectrum of fluralaner to agricultural and sanitary pests", J Asia-Pacific Entomol. 2017, 20:1213-1218.
Shin et al., "Changes in the Eye Microbiota Associated with Contact Lens Wearing", mBio. 2016, 7(2): in 6 pages.
Shoop et al., "Discovery and mode of action of afoxolaner, a new isoxazoline parasiticide for dogs" Vet Parasitol. 2014, 201:179-189.
Shtein et al., "Blepharitis", Official reprint from UpToDate® Wolters Kluwer, Jun. 2016, in 19 pages.
Sigel et al., "Structure, Function, and Modulation of GABAA Receptors", J Biol Chem. 2012, 287(48):40224-40231.
Sigma-Aldrich, "Ivermectin Product Specification", Prod No. 18898—Sigma-Aldrich.com, accessed 2019, 1 page.
Singh et al., "An Update on Therapeutic Management of Canine Demodicosis", Vet World. 2011, 4(1):41-44.
Six et al., "Comparative speed of kill of sarolaner (Simparica™ Chewables) and fluralaner (Bravecto®) against induced infestations of Amblyomma americanum on dogs", Parasit Vectors . . . 2016, 9:399 in 7 pages.
Six et al., "Comparative speed of kill of sarolaner (Simparica™) and fluralaner (Bravecto®) against induced infestations of Ctenocephalides felis on dogs" Parasit Vectors., 2016, 9:92 in 7 pages.
Six et al., "Efficacy of sarolaner, a novel oral isoxazoline, against two common mite infestations in dogs: *Demodex* spp. and *Otodectes cynotis*", Vet. Parasitol. 2016, 222:62-66.
Smith et al., "Demodex musculi Infestation in Genetically Immunomodulated Mice", Compara Med. 2016, 66(4):278-285.
Snyder et al., "Efficacy of lotilaner (Credelio™), a novel oral isoxazoline against naturally occurring mange mite infestations in dogs caused by *Demodex* spp." Parasit Vectors. 2017; 10 (532) in 7 pages.
Sojka Peter A., "Therapeutic Review—Isoxazolines", Author's Accepted Manuscript; Journal of Exotic Pet Medicine; 2018: pp. 1-16.
Sprong et al., Mar. 6, 2018, Control of Lyme borreliosis and other ixodes ricinis-borne diseases, Parasites & Vectors, 11(1):145, 16 pp.
Sudhakar, Chuppani, "Mange in Sheep and Goats" Retrieved from:|http://chuppanisudhakar.blogspot.com/2012/02/mange-in-sheep-and-goats.html; Feb. 5, 2012 in 3 pages.
Suntres et al., "The Bioactivity and Toxicological Actions of Carvacrol" Crit Reviews Food Science Nutri. 2015, 55(3):304-318.
Surface Pharmaceuticals Inc. "Corporate Presentation" Nov. 2017, PowerPoint, in 36 pages.
Szkaradkiewicz et al., "Bacillus oleronius and *Demodex* mite infestation in patients with chronic blepharitis", Clin Microbial Infect 2012, 18:1020-1025; Epub Oct. 22, 2011.
Taenzler et al., "Efficacy of fluralaner administered either orally or topically for the treatment of naturally acquired *Sarcoptes scabiei* var. *canis* infestation in dogs", Parasit Vectors . . . 2016, 9:392 in 5 pages.
Taenzler et al., "Efficacy of fluralaner against Otodectes cynotis infestations in dogs and cats" Parasit Vectors., 2017, 10:30 in 6 pages.
Taenzler et al., "Onset of activity of fluralaner (Bravecto™) against Ctenocephalides felis on dogs" Parasit Vectors . . . 2014, 7:567 in 4 pages.
Taenzler et al., "Prevention of transmission of Babesia canis by Dermacentor reticulatus ticks to dogs after topical administration of fluralaner spot-on solution" Parasit Vectors, 2016, 9:234 in 3 pages.
Taenzler et al., "Prevention of transmission of Babesia canis by Dermacentor reticulatus ticks to dogs treated orally with fluralaner chewable tablets (Bravecto™)", Parasit Vectors. 2015: in 6 pages.
Taenzler et al., "The effect of water and shampooing on the efficacy of fluralaner spot-on solution against Ixodes ricinus and Ctenocephalides felis infestations in dogs", Parasit Vectors, 2016, 9:233 in 5 pages.
Tan et al., "Contemporary Asymmetric Phase Transfer Catalysis: Large-Scale Industrial Applications", Org Process Res Dev. 2015, 19:1731-1746.
Tanrattana C., "Practical and update management of canine demodicosis" Thai J Vet Med Suppl. 2017, 47:S55-S56.
Tantiyaswasdikul, P.S., United Nations Fluazuron Summary Report, 2018, Retrieved from: http://www.fao.org/docrep/w8338e/w8338e09.htm: in 20 pages.
Tarr et al., "Case Report: Rectal Administration of Ivermectin to a Patient with Strongyloides Hyperinfection Syndrome", Am J Trop Med Hyg. 2003, 68(4):453-455.
Tater et al., "Canine and feline demodicosis" DVM Magazine 2008: pp. 1-11.
Taylor-Wells et al., "Variations in the Insect GABA Receptor, RDL, and Their Impact on Receptor Pharmacology", in *Advances in Agrochemicals et al.* by Gross et al. [Eds], ACS Symposium 2017, Chapter 1: pp. 1-21.
Tilley et al. [Eds], "Inflammation of the Eyelids (Blepharitis)" Blackwell's Five-Minute Veterinary Consult: Canine and Feline, Fifth Edition 2011, pp. 1-7.
Tomizawa et al., "Neonicotinoid Insecticide Toxicology: Mechanisms of Selective Action", Annu Rev Pharmacol Toxicol. 2005, 45:247-268.
Tomlinson et al., "The International Workshop on Meibomian Gland Dysfunction: Report of the Diagnosis Subcommittee", IOVS, Special Issue 2011, 52(4): 2006-2049.
Toutain et al., "The intravenous and oral pharmacokinetics of lotilaner in dogs", Parasit Vectors. 2017; 10:522 in 8 pages.
Treatment of Demodex Blepharitis with Ivermectin Gel 0.1 % Plus Metronidazole 1 % (2015). ClinicalTrials.gov, ClinicalTrials.gov Identifier: NCT02236403, 3 pp.
Türket al., "Comparison of Incidence of Demodex folliculorum on the Eyelash Follicule in Normal People and Blepharitis Patients", Türkiye Paraziteloji Dergisi, 2007, 31(4):296-297.
U.S. Department of Health & Human Services [HHS], "Toxicological Profile for Pyerethrins and Pyrethroids" Pyerethrins and Pyrethroids, 2003, in 328 pages.
UpToDate; Metronidazole (systemic); Drug information; Woters Kluwer, 2016 in15 pages.
US Food and Drug Administration, Jan. 26, 2022, Inactive ingredients in approved drug products search: frequently asked questions, www.fda.gov/drugs/drug-approvals-and-databases/inactive-ingredients-approved-drug-products-search-frequently-asked-questions, 6 pp.
Van Eeden et al., "Solvent and Surfactant Enhanced Solubilization, Stabilization, and Degradation of Amitraz", J Environ Science Health Part B, 2004, B39(1):33-51.
Van Zuuren E.J., "Rosacea", N Engl J Med. 2017, 377(18):1754-1764.
Wall et al., [Eds.] "Chorioptic mange", in *Veterinary Entomology*, Springer Science & Business Media, 1997, p. 341.
Walther et al., "Plasma pharmacokinetic profile of fluralaner (Bravecto™) and ivermectin following concurrent administration to dogs", Parasit Vectors 2015, 8:508 in 5 pages.
Walther et al., "Safety of concurrent treatment of dogs with fluralaner (Bravecto™) and milbemycin oxime—praziquantel", Parasit Vectors 2014, 7:481 in 3 pages.
Walther et al., "Safety of fluralaner chewable tablets (Bravecto™), a novel systemic antiparasitic drug, in dogs after oral administration", Parasit Vectors 2014, 7:87 in 7 pages.
Walther et al., "Safety of fluralaner, a novel systemic antiparasitic drug, in MDR1(−/−) Collies after oral administration", Parasit Vectors 2014, 7:86 in 3 pages.
Walther et al., "Safety of the concurrent treatment of dogs with Bravecto™ (fluralaner) and Scalibor™ protector band (deltamethrin)", Parasit Vectors. 2014, 7:105 in 2 pages.
Walther et al., "The effect of food on the pharmacokinetics of oral fluralaner in dogs", Parasit Vectors. 2014, 7:84: pp. 1-4.
Wang et al., "Direct nucleophilic difluoromethylation of aromatic isoxazoles activated by electron-withdrawing groups using (difluoromethyl) trimethylsilane" Science Open Research (SOR-CHEM) 2014, pp. 1-7.

(56) References Cited

OTHER PUBLICATIONS

Wang et al., 2020, Peribulbar injection of glucocorticoids for thyroid-associated ophthalmopathy and factors affecting therapeutic effectiveness: a retrospective cohort study of 386 cases, Experimental and Therapeutic Medicine, 20:2031-2038.
Watkins, Thomas. "Lessons abound for dermatologists when animal health and human health intersect." 7pp. Sep. 23, 2017. Dermatology News. Available online at: https://www.mdedge.com/dermatology/article/147784/medica-dermatology/lessons-abound-dermatologists-when-animal-health-and-human-health-intersect.
Weber et al., "Isoxazolines: A Novel Chemotype Highly Effective on Ectoparasites" ChemMedChem 2016, 11:270-276.
Weller Peter F., "Anthelminthic therapies", UpToDate 2016 (www.uptodate.com); Wolters Kluwer, in 5 pages.
Wengenmayer et al., "The speed of kill of fluralaner (Bravecto™) against *Ixodes ricinus* ticks on dogs", Parasit Vectors. 2014, 7:525, 5 pp.
White et al., "Controlled Trial and Dose-Finding Study of Ivermectin for Treatment of Onchocerciasis", J Infect Diseases, 1987, 156(3):463-470.
Wikipedia, "Demodex folliculorum" Retrieved from: https://en.wikipedia.org/w/index.php?title=Demodex_folliculorum&oldid=727508589, 2016, in 3 pages.
Williams et al., "A quantitative evaluation of the extent of fluralaner uptake by ticks (*Ixodes ricinus, Ixodes scapularis*) in fluralaner (Bravecto™) treated vs. untreated dogs using the parameters tick weight and coxal index", Parasit Vectors. 2015, 8:352 in 8 pages.
Williams et al., "Fluralaner activity against life stages of ticks using Rhipicephalus sanguineus and Ornithodoros moubata IN in vitro contact and feeding assays", Parasit Vectors. 2015; 8(90): 5 pages.
Williams et al., "Fluralaner, a novel isoxazoline, prevents flea (*Ctenocephalides felis*) reproduction in vitro and in a simulated home environment", Parasit Vectors., 2014, 7:275 in 6 pages.
World Health Organization (WHO), "Trichlorfon" International Programme on Chemical Safety (IPCS) 1992: pp. 1-166.
Yeu et al., 2022, Lotilaner ophthalmic solution, 0.25%, for the treatment of demodex blepharitis: results of a prospective, randomized, vehicle-controlled, double-masked, pivotal trial (saturn-1), Cornea, 00:1-9.
Yeu, et al., Safety and Efficacy of Topical Lotilaner 0.25% for the Treatment of Demodex Blepharitis: Results of the Saturn-1 Ph 2b/3 FDA-Pivotal Trial, presented at ASCRS 2021/SPS-107 Ocular Surface, Jul. 24, 2021.
Yilmaz et al., "Amitraz poisoning, an emerging problem: epidemiology, clinical features, management, and preventive strategies" Arch Dis Child 2003; 88: pp. 130-134.
Youngpradej Monchai, "Efficacy of acaricides in controlling broad mite, *Polyphagotarsonemus latus* (Banks) under laboratory and pot test conditions" Retrieved from : http://agris.fao.org/agris-search/search.do?recordID=TH2000002880; 1998 in 2 pages.
Zegans et al., "Considerations in Understanding the Ocular Surface Microbiome", Am J Ophthalmol. 2014, 158(3):420-422.
Zelczak Todd A., Mar. 25, 2017, Closing the Lid on Blepharitis, PowerPoint presentation, MOS 2017 Cleveland Seminar, 41 pages.
Zhang et al., "Discovery of an orally bioavailable isoxazoline benzoxaborole (AN8030) as a long acting animal ectoparasiticide", Bioorg Med Chem Lett. 2015, 25:5589-5593.
Zhang et al., "Optimization of isoxazoline amide benzoxaboroles for identification of a development candidate as an oral long acting animal ectoparasiticide" Bioorganic & Medicinal Chemistry Letters 26 (2016): pp. 3182-3186.
Zhang, Alexis Ceecee, et al., "Ocular Demodex: a systematic review of the clinical literature", Department of Optometry and Vision Sciences, Ophthalmic* Physiological Optics, The Journal of the College of Optometrists, Ophthalmic Physiol Opt 2020, pp. 1-44.
Zhao et al., "Association of Blepharitis with *Demodex*: A Meta-analysis", Ophthal Epidemiol. 2012, 19(2):95-102.
Zhao et al., "Insect γ-Aminobutyric Acid Receptors and Isoxazoline Insecticides: Toxicological ProfilesRelative to the Binding Sites of [$^3$H]Fluralaner, [$^3$H]-4'-Ethynyl-4-n-propylicycloorthobenzoate, and [$^3$H]Avermectin", J Agri. Food Chem. 2014, 62:1019-1024.
Zhao, Y.E. et al. (2012). "A meta-analysis of association between acne vulgaris and Demodex infestation," J. Zhejiang Univ. Sci. B. 13: 192-202.
Zheng et al., "Kinetics and mechanism of the hydrolysis of imidacloprid", Pestic Sci. 1999, 55:482-485.
Zhu et al., "Effect of viscosity on tear drainage and ocular residence time", Optom Vis Sci. Aug. 2008; 85(8):715-725; Abstract in 2 pages.
Zoetis U.S., 2019, "Terramycin® Ophthalmic Ointment", Patient Order Form downloaded from URL: <https://www.zoetisus.com/products/cats/terramycin-ophthalmic-ointment.aspx.>, in 2 pages.
Zoetis, Revolution Plus® (selamectin and sarolaner topical solution) Prescribing Information, Oct. 2018, available at: https://www.zoetisus.com/_locale-assets/pdf/revolution-plprescribing-information.pdf (accessed Jul. 13, 2020) in 2 pages.
International Search Report and Written Opinion for PCT/IB20/53229 mailed on Jul. 29, 2020 in 17 pages.
Packianthan et al., Aug. 16, 2017, Efficacy and safety of sarolaner (Simparica®) in the treatment and control of naturally occurring flea infestations in dogs presented as veterinary patients in Australia, Parasit Vectors, 10(1):387.

\* cited by examiner

METHOD OF ERADICATING TICKS THAT ATTACH TO HUMANS USING LOTILANER FORMULATIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

In some aspects, embodiments of the invention relate to treating and preventing various vector-borne and other transmittable pathogenic organisms, of which new therapeutic and prophylactic modalities are sorely needed.

SUMMARY

In some embodiments, disclosed herein are formulations, including pharmaceutical formulations, and methods of using the same for treatment and/or prophylaxis of a variety of vector-borne and other pathogenic diseases and related organisms, that comprise, consist essentially of, or consist of any number of features/elements disclosed herein.

In some embodiments, disclosed herein are formulations, including pharmaceutical formulations, and methods of using the same for treatment and/or prophylaxis of a variety of pathogenic diseases and related organisms involving parasites, bacteria, viruses, fungi, and/or other organisms that comprise, consist essentially of, or consist of any number of features/elements disclosed herein.

In some embodiments, disclosed herein is a method of treating malaria, comprising administering a therapeutic dose of an isoxazoline parasiticide formulation therapeutically effective to an individual in need thereof, the therapeutic dose sufficient to be systemically bioavailable sufficient to inhibit the health or life cycle of a Plasmodium species in the individual.

In some embodiments, the method comprises administering a plurality of doses of the isoxazoline parasiticide formulation within a 30 day period.

In some embodiments, the formulation is administered orally.

In some embodiments, the formulation is administered parenterally.

In some embodiments, the formulation is administered transdermally.

In some embodiments, the *Plasmodium* species is selected from the group consisting of: *P. falciparum, P. vivax, P. malaria, P. ovale* and *P. knowlesi.*

In some embodiments, the formulation is therapeutically effective to inhibit the health or life cycle of the *Plasmodium* species in a liver of the individual.

In some embodiments, the method further comprises administering another therapeutic agent therapeutically effective to inhibit the health or life cycle of a *Plasmodium* species in the individual.

In some embodiments, administering another therapeutic agent occurs in the same formulation as the isoxazoline parasiticide formulation.

10. The method of any of the preceding claims, further comprising identifying the individual diagnosed with malaria.

In some embodiments, the isoxazoline parasiticide is selected from the group consisting of fluralaner, lotilaner, sarolaner and afoxolaner.

In some embodiments, disclosed is an isoxazoline parasiticide formulation for use in treating malaria, said formulation therapeutically effective to an individual in need thereof, said formulation sufficient to be systemically bioavailable sufficient to inhibit the health or life cycle of a *Plasmodium* species in the individual.

In some embodiments, the isoxazoline parasiticide is selected from the group consisting of fluralaner, lotilaner, sarolaner and afoxolaner.

Also disclosed herein is a method of prophylaxis against a vector-borne disease, comprising administering a single therapeutic dose of an isoxazoline parasiticide formulation therapeutically effective to an individual in need thereof, the single therapeutic dose sufficient to be systemically bioavailable sufficient to inhibit the health or life cycle of a vector or vector-borne disease organism for at least about 1 month.

In some embodiments, the method is sufficient to be systemically bioavailable sufficient to inhibit the health or life cycle of a vector or vector-borne disease organism for at least about 3 months.

In some embodiments, the isoxazoline parasiticide is selected from the group consisting of fluralaner, lotilaner, sarolaner and afoxolaner.

In some embodiments, disclosed herein is a method of prophylaxis against a vector-borne disease, comprising: administering a plurality of spaced-apart therapeutic doses of an isoxazoline parasiticide formulation therapeutically effective to an individual in need thereof, wherein the spaced-apart therapeutic doses include between 2-7 doses within a week, but no further doses within at least about a 1 month period, the plurality of space-apart therapeutic doses sufficient to be systemically bioavailable sufficient to inhibit the health or life cycle of a vector or vector-borne disease organism for at least about 1 month.

In some embodiments, the plurality of spaced-apart therapeutic doses are oral doses of an isoxazoline parasiticides, the oral doses each about or less than about 500 mg.

In some embodiments, the method further comprises no further doses within at least about a 3 month period.

In some embodiments, the method is sufficient to be systemically bioavailable sufficient to inhibit the health or life cycle of a vector or vector-borne disease organism for at least about 3 months.

In some embodiments, the vector-borne disease comprises malaria.

In some embodiments, the vector-borne disease comprises Lyme disease.

In some embodiments, the vector-borne disease comprises one or more of the group consisting of: dengue, West Nile virus, chikungunya, yellow fever, filariasis, tularemia, dirofilariasis, Japanese encephalitis, St. Louis encephalitis, Western equine encephalitis, Zika, EEE (Eastern Equine Encephalitis), Lyme disease, Anaplasmosis, Ehrlichiosis, Babesiosis, Borrelia miyamotoi disease, Rickettsia parkeri spotted fever, Pacific Coast tick fever, Ehrlichia muris-like infection, Heartland virus, Bourbon virus, *B. mayonii* infection and other tickborne diseases.

In some embodiments, disclosed herein are methods of treating or preventing a viral infection, comprising administering to a subject in need thereof a pharmaceutical composition comprising an isoxazoline parasiticide, the formulation therapeutically effective to treat or prevent the viral infection in the subject.

In some embodiments, the method comprises treating the viral infection.

In some embodiments, the pharmaceutical composition is a single one-time dose.

In some embodiments, the viral infection comprises a coronavirus infection.

In some embodiments, the viral infection comprises SARS-COV 2 (COVID 19).

In some embodiments, the pharmaceutical composition is sufficient to be systemically bioavailable sufficient to inhibit the health or life cycle of the virus for at least about 1 month.

In some embodiments, the isoxazoline parasiticide is selected from the group consisting of: fluralaner, sarolaner, lotilaner, afoxolaner, fluxametamide and isocycloseram.

In some embodiments, the isoxazoline parasiticide is the single active agent in the pharmaceutical composition.

In some embodiments, the method further comprises one or more of the following additional active agents: baricitinib; lopinavir and/or ritonavir, darunavir, favipiravir, remdesivir, ribavirin, galidesivir, BCX-4430, Arbidol, chloroquine, hydroxychloroquine, mefloquine and/or nitazoxanide.

In some embodiments, disclosed herein is a method of prophylaxis against a viral infection, comprising: administering a plurality of spaced-apart therapeutic doses of an isoxazoline parasiticide formulation therapeutically effective to an individual in need thereof, wherein the spaced-apart therapeutic doses include between 2-7 doses within a week, but no further doses within at least about a 1 month period, the plurality of space-apart therapeutic doses sufficient to be systemically bioavailable sufficient to inhibit the life cycle and/or replication of a virus for at least about 1 month.

In some embodiments, the viral infection comprises a coronavirus.

In some embodiments, the viral infection comprises SARS-COV 2 (COVID 19).

In some embodiments, the plurality of spaced-apart therapeutic doses are oral doses of an isoxazoline parasiticides, the oral doses each about or less than about 500 mg.

In some embodiments, the method further comprises no further doses within at least about a 3 month period.

In some embodiments, the method is sufficient to be systemically bioavailable sufficient to inhibit the replication or life cycle of a virus for at least about 3 months.

In some embodiments, the isoxazoline parasiticide is selected from the group consisting of: fluralaner, sarolaner, lotilaner, afoxolaner, fluxametamide and isocycloseram.

In some embodiments, the method further comprises one or more of the following additional active agents: baricitinib; lopinavir and/or ritonavir, darunavir, favipiravir, remdesivir, ribavirin, galidesivir, BCX-4430, Arbidol, chloroquine, hydroxychloroquine, mefloquine and/or nitazoxanide.

Also disclosed herein is an isoxazoline parasiticide medicament for use in treating or preventing a pathogen, said medicament therapeutically effective to an individual in need thereof, said formulation sufficient to be systemically bioavailable sufficient to inhibit the health or life cycle of the pathogen.

In some embodiments, the pathogen comprises a virus.

In some embodiments, the virus comprises a coronavirus.

In some embodiments, the virus comprises SARS-COV 2 (COVID 19).

In some embodiments, the medicament is for treating the pathogen.

In some embodiments, the medicament is for preventing the pathogen.

In some embodiments, the isoxazoline parasiticide is selected from the group consisting of: fluralaner, sarolaner, lotilaner, afoxolaner, fluxametamide and isocycloseram.

DETAILED DESCRIPTION

Malaria is a serious, sometimes life-threatening disease caused by *Plasmodium* parasites that are transmitted to people through the bites of infected *Anopheles* mosquitoes, known as malaria vectors. According to the World Health Organization (WHO), in 2017, there were an estimated 219 million cases of malaria in 87 countries, and the estimated number of malaria deaths stood at 435,000 in 2017.

The WHO African Region is said to carry a disproportionately high share of the global malaria burden. In 2017, the region was home to 92% of malaria cases and 93% of malaria deaths. According to WHO, 5 countries accounted for nearly half of all malaria cases worldwide: Nigeria (25%), the Democratic Republic of the Congo (11%), Mozambique (5%), India (4%) and Uganda (4%). It has been estimated that nearly half of the world's population was at risk of malaria. Most malaria cases and deaths occur in sub-Saharan Africa. However, the WHO regions of South-East Asia, Eastern Mediterranean, Western Pacific, and the Americas are also at risk. In 2017, 87 countries and areas had ongoing malaria transmission.

Total funding for malaria control and elimination reached an estimated $3.1 billion in 2017. Some population groups are at considerably higher risk of contracting malaria and developing severe disease than others. These include infants, children under 5 years of age, pregnant women and patients with HIV/AIDS, as well as non-immune migrants, mobile populations and travelers.

There are at least 5 parasite species that cause malaria in humans, including *P. falciparum, P. vivax, P. malaria, P. ovale* and *P. knowlesi*. In 2017, *P. falciparum* accounted for 99.7% of estimated malaria cases in the WHO African Region, as well as in the majority of cases in the WHO regions of South-East Asia (62.8%), the Eastern Mediterranean (69%) and the Western Pacific (71.9%). *P. vivax* is the predominant parasite in the WHO Region of the Americas, representing 74.1% of malaria cases.

Malaria is an acute, febrile illness. Symptoms typically manifest about 10-15 days after the culprit mosquito bite. The initial symptoms, typically fever, headache, and chills may be mild and difficult to recognize as malaria. If not treated within 24 hours, *P. falciparum* malaria for example can progress to severe illness, often leading to death.

Children with severe malaria frequently develop one or more of the following symptoms: severe anemia, respiratory distress in relation to metabolic acidosis, or cerebral malaria. In adults, multi-organ failure is also frequent. In malaria endemic areas, people may develop partial immunity, allowing asymptomatic infections to occur.

There are more than 400 different species of *Anopheles* mosquito; around 30 are malaria vectors of major importance. Typical vector mosquitoes bite at nighttime. The intensity of transmission depends on factors related to the parasite, the vector, the human host and the environment.

*Anopheles* mosquitoes lay their eggs in water, which hatch into larvae, eventually emerging as adult mosquitoes. The female mosquitoes seek a blood meal to provide nutrition to their eggs. Transmission can be of increased incidence in locations where the mosquito lifespan is longer (so that the parasite has time to complete its development inside the mosquito) and where it prefers to bite humans rather than other animals. The long lifespan and strong human-biting habit of the African vector species is a primary reason approximately 90% of the world's malaria cases are in Africa.

Transmission also depends on climatic conditions that may affect the number and survival of mosquitoes, such as rainfall patterns, temperature and humidity. In many places, transmission is seasonal, with the peak during and just after the rainy season. Malaria epidemics can occur when climate and other conditions suddenly favor transmission in areas where people have little or no immunity to malaria. They can also occur when people with low immunity move into areas with intense malaria transmission, for instance to find work, or as refugees.

Human immunity is another important factor, especially among adults in areas of moderate or intense transmission conditions. Partial immunity is developed over years of exposure, and while it never provides complete protection, it does reduce the risk that malaria infection will cause severe disease. For this reason, most malaria deaths in Africa occur in young children, whereas in areas with less transmission and low immunity, all age groups are at risk.

Due to at least the foregoing, improved systems and methods of treating and/or preventing malaria, as well as other conditions including those disclosed herein, are needed.

In some embodiments, disclosed herein are methods of treating *Plasmodium* infestation and/or malaria via delivery of one, two, or more systemic doses of an isoxazoline anti-parasitic therapeutic agent to an individual with confirmed or suspected infestation of *Plasmodium* and/or malaria.

In some embodiments, disclosed herein are methods of treating infestation of vector-borne organisms such as, for example, *Borrelia Burgdorferi, Borrelia mayonii, Borrelia miyamotoi*, other *Borrelia* species, *Babesia microti*, other *Babesia* species, *Ehrlichia muris eauclairensis, Ehrlichia chaffeensis, Ehrlichia ewingii*, other *Ehrlichia* species, *Anaplasma phagocytophilum*, other *Anaplasma* species, *Francisella tularensis*, other *Francisella* species, *Rickettsia rickettsii, Rickettsia parkeri*, other *Rickettsia* species, Powassan virus, Heartland virus, Bourbon virus and/or Colorado tick fever virus via delivery of one, two, or more systemic doses of an isoxazoline anti-parasitic therapeutic agent to an individual with confirmed or suspected infestation of such vector-borne organisms and/or any disease resulting therefrom.

In some embodiments, disclosed herein are methods of preventing vector-borne disease in humans and other animals, such as, for example, Lyme disease, Anaplasmosis, Ehrlichiosis, Babesiosis, *Borrelia miyamotoi* disease, relapsing fever, Powassan virus disease, Tularemia, Heartland virus disease, Bourbon virus disease, Rocky Mountain spotted fever, *R. parkeri* rickettsiosis, Colorado tick fever, tick-borne relapsing fever, Southern tick-associated rash illness, or other such tick-borne diseases, via delivery of one, two, or more systemic doses of an isoxazoline anti-parasitic agent to an individual, and which prevents infection by killing the organism-carrying vector, for example mosquitoes of the *Anopheles* genus (including *Anopheles gambiae, Anopheles stephensi* and others), Ixodes Scapularis, *Amblyomma americanum, Dermacentor variabilis, Rhipicephalus sanguineus, Ixodes cookie, Amblyomma maculatum, Dermacentor andersoni, Ornithodoros* spp., *Ixodes pacificus*, or other species of relevant vector, prior to passage of the organism from vector to human, or prior to biting another human in close proximity, for example within about 1, 2, 4, 6, 8, 12, 15, 18, 24 or more hours, within about 5, 10, 15, 30, 45 minutes, or in the range of about 4-8 hours, or ranges including any two of the foregoing values.

In some embodiments, disclosed herein are methods of preventing vector-borne disease in humans via delivery of one, two, or more systemic doses of an isoxazoline anti-parasitic agent to one or more individuals in close geographic proximity (for example, within about 1, 2, 3, 4, 5, 6, 7, 8, 9, 10 or more square miles, within about 10 to 50 square miles, or within about 100 square miles), and which prevents infection by killing disease-carrying vectors such as mosquitoes of the *Anopheles* genus (for example *Anopheles gambiae, Anopheles stephensi* and others) after biting said individual(s) to thereby reduce the local vector population.

Also disclosed herein are isoxazoline parasiticide formulations for use in treating vector-borne diseases such as Lyme disease, Anaplasmosis, or malaria, or others as disclosed elsewhere herein, said formulation therapeutically effective to an individual in need thereof, said formulation sufficient to be systemically bioavailable sufficient to inhibit the health or life cycle of a vector-borne organism such as a *Plasmodium* species in the individual. The formulation could have any number of properties as disclosed elsewhere herein.

Also disclosed herein are isoxazoline parasiticide formulations for use in preventing vector-borne disease, said formulation sufficient to be systemically bioavailable sufficient to cause the death of a vector that encounters said systemically circulating anti-parasitic agent with reasonable probability (for example, more than about 50%, 60%, 70%, 80%, 90%, or more or less likelihood of vector mortality). The formulation could have any number of properties as disclosed elsewhere herein.

"Compound," "compounds," "chemical entity" and "chemical entities" as used herein refers to a compound encompassed by the generic formulae disclosed herein, any subgenus of those generic formulae, and any forms of the compounds within the generic and subgeneric formula, including the racemates, stereoisomers and tautomers of the compound or compounds.

As used herein, the term "effective amount" means that amount of a drug or pharmaceutical agent that will elicit the biological or medical response of a tissue, system, human or non-human animal that is being sought, for instance, by a researcher or clinician.

Furthermore, the term "therapeutically effective amount" means any amount which, as compared to a corresponding subject who has not received such amount, results in improved treatment, healing, prevention, or amelioration of a disease, disorder, or side effect, or a decrease in the rate of advancement of a disease or disorder. The term also includes within its scope amounts effective to enhance normal physiological function.

As used herein, the term "excipient" means the substances used to formulate active pharmaceutical ingredients (API) into pharmaceutical formulations. Excipients (e.g., mannitol, Captisol®, lactose, starch, magnesium stearate, sodium saccharine, talcum, cellulose, sodium croscarmellose, glucose, gelatin, sucrose, magnesium carbonate and the like) are an integral part of pharmaceutical development and help to achieve the desired product profile including but not limited to aiding in manufacturing, modifying a drug's stability, and improving efficacy. Acceptable excipients are non-toxic and do not adversely affect the therapeutic benefit of at least one chemical entity described herein. Such excipient may be any solid, liquid, semi-solid or, in the case of an aerosol composition, gaseous excipient that is generally available.

Further the term "excipient" encompasses solubilizing agents, stabilizers, carriers, diluents, bulking agents, pH buffering agents, tonicifying agents, antimicrobial agents, wetting agents and emulsifying agents (e.g., sodium acetate, sodium citrate, cyclodextrin derivatives, sorbitan monolaurate, triethanolamine acetate, triethanolamine oleate and the like). Preferably, excipients are approved for or considered to be safe for human and other animal administration. Generally, depending on the intended mode of administration, the pharmaceutical composition will contain about 0.005% to 95%; in certain embodiments, about 0.5% to 50% by weight of a chemical entity. As used herein, "lyophilization," "lyophilized" and "freeze-dried" refers to a process by which the material to be dried is first frozen and then the ice or frozen solvent is removed by sublimation in a vacuum environment. The term "lyophilized powder" or "lyophilized preparation" refers to any solid material obtained by lyophilization, i.e., freeze-drying of an aqueous solution. The aqueous solution may contain non-aqueous solvents, i.e. a solution composed of aqueous and one or more non-aqueous solvent(s). Preferably, a lyophilized preparation is one in which the solid material is obtained by freeze-drying a solution composed of water as a pharmaceutically acceptable excipient.

As used herein, the term "pharmaceutically acceptable" refers to those compounds, materials, compositions and dosage forms which are, within the scope of sound medical judgment, suitable for use in contact with the tissues of human beings and animals without excessive toxicity, irritation, or other problem or complication, commensurate with a reasonable benefit/risk ratio.

As used herein, the term "pharmaceutically acceptable salt" refers to pharmaceutically acceptable salts derived from a variety of organic and inorganic counter ions well known in the art and include, by way of example only, sodium, potassium, calcium, magnesium, ammonium and tetraalkylammonium, and when the molecule contains a basic functionality, salts of organic or inorganic acids, such as hydrochloride, hydrobromide, tartrate, mesylate, acetate, maleate and oxalate.

Pharmaceutically acceptable salts of compounds may be prepared. These pharmaceutically acceptable salts may be prepared in situ during the final isolation and purification of the compound, or by separately reacting the purified compound in its free acid or free base form with a suitable base or acid, respectively.

Accordingly, the word "or" in the context of "a compound or a pharmaceutically acceptable salt thereof" is understood to refer to either a compound or a pharmaceutically acceptable salt thereof (alternative), or a compound and a pharmaceutically acceptable salt thereof (in combination).

As used herein, the term "pharmaceutical composition" (which can also be referred to herein as a formulation or formulations) describes a compound and one or more pharmaceutically acceptable excipients. The excipient(s) can be acceptable in the sense of being compatible with the other ingredients of the composition and not deleterious to the recipient thereof. In accordance with another aspect of the invention there is also provided a process for the preparation of a pharmaceutical composition including the agent, or pharmaceutically acceptable salts thereof, with one or more pharmaceutically acceptable excipients. The pharmaceutical compositions can be for use in the treatment and/or prophylaxis of any of the conditions described herein.

Pharmaceutical compositions adapted for parental administration include aqueous and non-aqueous sterile injection solutions which may contain anti-oxidants, buffers, bacteriostats and solutes which render the composition isotonic with the blood of the intended recipient; and aqueous and non-aqueous sterile suspensions which may include suspending agents and thickening agents. The compositions may be presented in unit-dose or multi-dose containers, for example sealed ampoules and vials, and may be stored in a freeze-dried (lyophilized) condition requiring only the addition of the sterile liquid carrier, for example water for injections, immediately prior to use. Extemporaneous injection solutions and suspensions may be prepared from sterile powders, granules and tablets.

"Racemates" refers to a mixture of enantiomers. In an embodiment of the invention, a therapeutic agent, or pharmaceutically acceptable salts thereof, are enantiomerically enriched with one enantiomer wherein all of the chiral carbons referred to are in one configuration. In general, reference to an enantiomerically enriched compound or salt, is meant to indicate that the specified enantiomer will comprise more than 50% by weight of the total weight of all enantiomers of the compound or salt.

"Solvate" or "solvates" of a compound refer to those compounds, as defined above, which are bound to a stoichiometric or non-stoichiometric amount of a solvent.

Solvates of a compound includes solvates of all forms of the compound. In certain embodiments, solvents are volatile, non-toxic and/or acceptable for administration to humans in trace amounts. Suitable solvates include water.

"Stereoisomer" or "stereoisomers" refer to compounds that differ in the chirality of one or more stereocenters. Stereoisomers include enantiomers and diastereomers.

Optically active (R)- and (S)-isomers and d and l isomers can be prepared using chiral synthons or chiral reagents or resolved using conventional techniques. If, for instance, a particular enantiomer of a compound of the present invention is desired, it can be prepared by asymmetric synthesis, or by derivatization with a chiral auxiliary, where the resulting diastereomeric mixture is separated and the auxiliary group cleaved to provide the pure desired enantiomers. Alternatively, where the molecule contains a basic functional group, such as an amino group, or an acidic functional group, such as a carboxyl group, diastereomeric salts can be formed with an appropriate optically active acid or base, followed by resolution of the diastereomers thus formed by fractional crystallization or chromatographic means known in the art, and subsequent recovery of the pure enantiomers. In addition, separation of enantiomers and diastereomers is frequently accomplished using chromatography employing chiral, stationary phases, optionally in combination with chemical derivatization (e.g., formation of carbamates from amines).

"Tautomer" refer to alternate forms of a compound that differ in the position of a proton, such as enol-keto and imine-enamine tautomers, or the tautomeric forms of heteroaryl groups containing a ring atom attached to both a ring —NH— moiety and a ring =N-moiety such as pyrazoles, imidazoles, benzimidazoles, triazoles and tetrazoles.

Such compounds of some embodiments can exist in particular geometric or stereoisomeric forms. The invention contemplates all such compounds, including (−)- and (+)-enantiomers, (R)- and (S)-enantiomers, (d)-isomers, (l)-isomers, the racemic mixtures thereof and other mixtures thereof, such as enantiomerically enriched mixtures, as falling within the scope of the invention. Additional asymmetric carbon atoms can be present in a substituent such as an alkyl group. All such isomers, as well as mixtures thereof, are intended to be included in this invention.

"Treating" or "treatment" of a disease in a patient refers to 1) preventing the disease from occurring in a patient that is predisposed or does not yet display symptoms of the disease; 2) inhibiting the disease or arresting its development; or 3) ameliorating or causing regression of the disease or symptoms thereof.

Isoxazoline parasiticides are a class of parasiticide agents that are conventionally used as insecticides and acaricides for veterinary indications. One or more isoxazoline parasiticides can be utilized with systems and methods as disclosed herein, either alone or in combination with other therapeutic agents. In some embodiments, patients in need thereof can be treated with an active agent from the isoxazoline parasiticide family of chemicals, which include but are not limited to isoxazoline-substituted benzamide derivatives. Not to be limited by theory, isoxazoline parasiticides can act as GABA-chloride antagonists to selectively target the nervous system of certain organisms. The GABA-mediated chloride influx can lead to hyperpolarization of the cellular membrane and generates an inhibitory postsynaptic potential, which decreases the probability of an action potential, and lead to paralysis and eventual death of the organisms. The isoxazoline parasiticide can include, for example, any number of fluralaner, sarolaner, lotilaner, afoxolaner, isocycloseram and/or fluxametamide, including derivatives, analogues, and l- and d-isomers thereof, including but not limited to enantiomers, compositions comprising racemic mixtures and enantiomerically pure compositions. In some embodiments, the isoxazoline parasiticide, or other active ingredients as disclosed herein are the only active ingredient utilized in the formulation and/or method. In some embodiments, the isoxazoline parasiticide is an isoxazoline-substituted benzamide derivative. In some embodiments, the isoxazoline parasiticide has one, two, three, or more fluorine groups, such as trifluorine groups in its chemical structure (e.g., $R-CF_3$). In some embodiments, the formulation can include a precursor compound (e.g., an isoxazole carboxylic acid, including isoxazole-4-carboxylic acid), or a degradation compound (e.g., isoxazolethiopene carboxylic acid) to other isoxazoline parasiticides, instead or, or in addition to isoxazoline parasiticides disclosed elsewhere herein, in amounts/concentrations disclosed elsewhere herein for example. In some embodiments, a formulation does not include any precursor or degradation compounds, including those disclosed herein. In some embodiments, a formulation can includepyrazole-5-carboxamides including an arylisoxazoline moiety.

In some embodiments, systems and methods can be therapeutically effective to kill a disease-carrying vector, which could require only a single oral dose of an isoxazoline parasiticide, such as less than about 500 mg for example, or in the range of about 100-1,000 mg, or about or less than about 1,000, 900, 800, 700, 600, 500, 400, 300, 200, 100, 75, 50, 25 mg, or less, or ranges including any two of the foregoing values, to provide vector protection for about or at least about 45, 60, 75, 90 days, or more. In some embodiments the dosage may only require a single oral dose of less than 100 mg, for example 50-100 mg, if it were desirable to reduce the duration or magnitude of systemic exposure. In some embodiments, multiple dosages could be available to deliver preferred blood plasma levels for individuals of differing body weight. In some embodiments the dosage may be lower, more effective, and better absorbed in the gut if given with or within 30, 60, or 90 min before or after food intake. In some embodiments, disclosed herein is providing relatively low dose administration of an isoxazoline parasiticide for vector control, including but not limited to malaria vector control. Such low dose administration can provide a very low systemic exposure for safety without necessarily requiring a high mosquito kill rate. Such formulations and methods can provide coverage that weakens (or kills a portion of) the vector (e.g., mosquitos or others) such that they are not able to bite or otherwise transmit the organism to the next person. Generally, a higher dose is needed to kill ticks than mosquitos, by, for example, 2, 3, 4, or 5-fold. In some embodiments, a formulation could include a single oral dose, followed by none, or a limited number of follow-up smaller doses (e.g., 1, 2, 3, 4, 5, 6, 7, or more or less follow-up doses or ranges including any two of the foregoing values administered daily, weekly, or other intervals as disclosed for example elsewhere herein). In some embodiments, the therapeutic agent is provided in a one-time low dose given at some interval (e.g., monthly or longer), including but not limited to every 2-3 weeks, 1, 2, 3, 4, 5, 6 months, or more or less, or ranges including any of the foregoing values. In some embodiments, administration once every 3-4 months could ultimately mean once per year for places with seasonal malaria transmission. In some embodiments, the formulation or method results in a peak or random blood, plasma, serum, or other fluid level in the patient of isoxazoline parasiticide, or other therapeutic agent including those disclosed elsewhere herein that is no more than about 1,000, 750, 500, 250, 200, 175, 150, 125, 100, 75, 50, 25, 20, 15, 10, 5, 4, 3, 2, 1 ng/ml or even less.

In some embodiments, administration in a therapeutically effective dose can result in sufficient systemic exposure/plasma concentration of an isoxazoline parasiticide to not only provide vector protection, but additionally disrupt the health, and/or life cycle (e.g., replication) of *Plasmodium* or other species, including parasiticidal activity. Such other species could include tick-borne organisms such as *Borrelia Burgdorferi*, *Borrelia mayonii*, *Borrelia miyamotoi*, other *Borrelia* species, *Babesia microti*, other *Babesia* species, *Ehrlichia muris eauclairensis*, *Ehrlichia chaffeensis*, *Ehrlichia ewingii*, other *Ehrlichia* species, *Anaplasma phagocytophilum*, other *Anaplasma* species, *Francisella tularensis*, other *Francisella* species, *Rickettsia rickettsia*, *Rickettsia, parkeri*, other *Rickettsia* species, Powassan virus, Heartland virus, Bourbon virus, and Colorado tick fever virus. Not to be limited by theory, this can require multiple and/or higher dosing than for vector control indications as discussed above. In some embodiments, the dosing can be more than a single oral dose over a 45, 60, 75, 90, or more day period, such as at least about 2, 3, 4, 5, 6, 7, or more doses. The doses can be, for example, 1, 2, 3, 4, 5, 6 or more times weekly, or 1, 2, 3, or more times daily, for example. In some embodiments, the cumulative dosing of isoxazoline parasiticide administered in a course of treatment can be at least about 500 mg, 1 g, 1.5 g, 2 g, 3 g, 4 g, 5 g, 6 g, 7 g, 8 g, 9 g, 10 g, or more divided over a period of at least about 1 day, 2 days, 3 days, 4 days, 5 days, 6 days, 7 days, 2 weeks, 3 weeks, 4 weeks, 45, 60, 75, 90, or more days. In some embodiments, the dosage can be more than a single oral dose, of which the dosages may be different amounts. In some embodiments, the number of *Plasmodium* organisms in a target location in an individual can be decreased by at least 10%, 20%, 30%, 40%, 50%, 60%, 70%, 80%, 90% or more 1, 2, 3, 4, 5, 6, 7, 10, 14, or more days after therapy relative to prior to the initiation of therapy.

In some embodiments, the therapeutic agent, e.g., isoxazoline parasiticide and/or other agents can be administered to create peak, trough, or random plasma concentrations over 1, 2, 3, 4, 5, 6, 7, or more days, for example, between about 1 ng/ml and about 50,000 ng/mL, between about 10 ng/mL and about 10,000 ng/mL, between about 100 ng/mL and about 5,000 ng/mL, about, at least about, or no more than about 1, 5, 10, 50, 100, 200, 250, 300, 350, 400, 450, 500, 600, 700, 800, 900, 1,000, 5,000, 10,000, 25,000, or 50,000 ng/mL, or ranges including any two of the foregoing values. In some embodiments, the isoxazoline parasiticide can be administered to create peak, trough, or random plasma concentrations over 1, 2, 3, 4, 5, 6, 7, or more days, for example, between about 1 nM and about 50,000 nM, between about 10 nM and about 10,000 nM, between about 100 nM and about 5,000 nM, about, at least about, or no more than about 1, 5, 10, 50, 100, 200, 250, 300, 350, 400, 450, 500, 600, 700, 800, 900, 1,000, 5,000, 10,000, 25,000, or 50,000 nM, or ranges including any two of the foregoing values.

In some embodiments, the therapeutic agent, e.g., isoxazoline parasiticide and/or other agents can be administered in such a way to create a long-acting (for example, 1, 2, 3, 4, 5, 6, 7, or more days, 2, 3, 4, or more weeks, 2, 3, 4, 5, 6, or more months, or more or less) and relatively constant blood plasma exposure. As a non-limiting example, the parasiticide could be delivered via solid oral tablets once per week over a three-week interval with no further therapy with the parasiticides within about 1, 2, 3, 4, 5, 6 months or more or less thereafter, wherein each tablet systemically delivers isooxazoline so as to maintain relatively constant blood plasma levels (e.g., variation of less than about 10%, or less than about 20%) over a period of about 1, 2, 3, 4, 5, 6 months or more or less, or ranges including any two of the foregoing values.

In some embodiments, the therapeutic agent, e.g., isoxazoline parasiticide and/or other agents can be administered in only a one-time single dose, or in about, at least about, or no more than about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 doses, or ranges including any two of the foregoing values.

In some embodiments, a therapeutically effective dose can inhibit *Plasmodium* replication in a target organ of a mammal, such as a human, and improve signs and/or symptoms of malaria. The target organ can be the liver, spleen, bone marrow, or other areas.

In some embodiments, systems and methods can treat various *Plasmodium* species, including but not limited to *P. falciparum, P. vivax, P. malaria, P. ovale, P. knowlesi*, and others.

In some embodiments, the dose can result in systemic exposure/plasma concentration that is meaningfully higher than which is required to treat an individual with an infection/infestation, in order to reduce the probability of resistance evolution of the parasite.

In some embodiments, an isoxazoline parasiticide formulation can be delivered orally (e.g., in tablet, chew, capsule, syrup, sublingual, dispersible, crushable, dissolvable, or other formulation), via injection (e.g., intramuscular, subcutaneous, intravenous, intraosseous), transdermally (e.g., via a patch, cream, ointment, oil, etc.), topically without transdermal absorption (e.g., via a band-aid, film, clothing, etc.) via an oral or nasal spray, via a transrectal or transvaginal suppository, an eye drop formulation at a dose sufficient for therapeutically effective systemic bioavailability, and the like. In some embodiments, the isoxazoline parasiticide may be administered in more than one format or administration route to achieve some desirable effect, for example, as both an oral tablet and dermal application via a patch, cream, ointment, and the like.

In some embodiments, the formulation is configured for systemic use, and not local use. In some embodiments, the formulation is configured to be delivered via an ophthalmic route. In some embodiments, the formulation is configured to be delivered transdermally.

In some embodiments, an isoxazoline parasiticide agent can be utilized in combination with one, two, or more additional anti-malarial, antibiotic, and/or anti-parasitic agents for unexpectedly synergistic effect to treat other diseases or conditions, such as malaria, scabies, lice, or nematode infestation, to reduce the probability of resistance, to boost efficacy in killing or otherwise inactivating vectors, or for other beneficial effect. The additional anti-malarial agent(s) could be a different isoxazoline parasiticide agent (e.g., fluralaner and lotilaner together, via the same or different administration routes, as one non-limiting example). The additional anti-malarial agent could be one or more of, for example, chloroquine, hydroxychloroquine, coartem, mefloquine, proguanil, chlorproguanil, chlorguanide, biguanides, pyrimidine, trimethoprim, chloroquine, lumefantrine, atovaquone, pyrimethamine, pyrimethamine-sulfadoxine, pyrimethamine-dapsone, halofantrine, quinine, quinidine, cinchonine, cinchonidine, Quinimax (quinine-quinidine-cinchonin), amodiaquine, amopyroquine, sulfonamides and other sulfa agents (e.g., sulfadoxine, trimethoprim-sulfamethoxazole), artemisinin, ASAQ (artesunate-amodiaquine), arteflene, artemether, artesunate, primaquine, pyronaridine, clindamycin, and combinations thereof. The additional agent(s) could be another anti-parasitic agent, such as ivermectin, moxidectin, selamectin, doramectin, eprinomectin, abamectin, or any other of the avermectin class. In other embodiments, the isoxazoline parasiticide could be combined with an antibiotic, such as doxycycline, amoxicillin, cefuroxime axetil, azithromycin, clarithromycin, or erythromycin. In other embodiments, the isoxazoline parasiticide can be the only active agent in the systemic formulation. In other embodiments, any two of the foregoing active agents can be utilized, with or without an isoxazoline parasiticide.

Also disclosed herein are methods of simultaneously treating malaria in infected individuals and creating mass population resistance to malaria by administrating an isoxazoline parasiticide agent to both infected and uninfected individuals in a selected geography. The isoxazoline parasiticide can be at a therapeutically effective dose sufficient to treat *Plasmodium* infection in an infected individual and sufficient to kill mosquitos who feed on the blood of dosed individuals. The mass population dosing can be effective in treating *Plasmodium* in infected individuals, and also reduce the mosquito population in the geography.

In some embodiments, disclosed herein are methods of vector-borne disease treatment and/or prevention by combining an isoxazoline antiparasitic agent with vector control methods or technologies. Vector control methods or technologies could include one, two, or more of the following: nets, pesticide sprays or other formulations, education, standing water removal, traps, smoke/incense, and the like. In some embodiments, the isoxazoline antiparasitic agent may be used to coat, cover, saturate, or otherwise be administered to any item that may come in contact with a relevant vector, such as nets, indoor or outdoor walls, floors, ceilings, furniture, clothing (including shoes, boots, gloves, hats, glasses, etc.), fences, railings, and the like.

In some embodiments, the administered dose of the isoxazoline parasiticide formulation is therapeutically effective to treat *Plasmodium* infestation in an infected individual, but not high enough as to produce/induce undesired and/or unacceptable side effects.

In some embodiments, disclosed herein is a sustained-release formulation and or drug-device configuration utilized to reduce the frequency of dosing and/or increase duration of effect and/or increase drug compliance and/or reduce the probability and/or rate of vector resistance to the isoxazoline parasiticide and/or other therapeutic agents used in a combination therapy. A long half-life isoxazoline parasiticide formulation can be utilized in combination with a slow/sustained-release technology to provide a very long period of sustained plasma drug levels. The sustained period could be, for example, about or at least about 1, 2, or 3 weeks, 1, 2, 3, 4, 5, 6, 7, 8, 9, 10, 11, 12, 15, 18, 21, 24 months, 3, 4, 5, or more years, or ranges including any two of the foregoing values. The sustained-release formulation could include any of the embodiments described herein, including a dermal patch, a cream, an ointment, a gel (including any type of hydrogel containing an isoxazoline, which could be delivered dermally, rectally, via injection, or by other route of administration depending on desired effect), oral dosage form, or any other formulation.

In some embodiments, the isoxazoline parasiticide could be administered via a formulation that causes release into systemic circulation at a specified region of the body. For example, the parasiticide could become available for systemic absorption following oral administration by absorption in the stomach, or in the gut, depending on the desired performance. Such absorption could be enhanced if given in close proximity to food intake.

In some embodiments, the isoxazoline parasiticide's effect as described in other embodiments as disclosed herein may be supported, enhanced, or otherwise improved by the activity of metabolites of the isoxazoline parasiticide.

In some embodiments, the water supply for a particular geography can be dosed with an isoxazoline parasiticide to maintain a concentration of isoxazoline parasiticide therapeutically effective to provide mass population prophylaxis.

In some embodiments, animals can be dosed with an isoxazoline parasiticide to maintain a concentration of isoxazoline parasiticide therapeutically effective to provide, support, or enhance vector control. Such animals could include livestock (for example, cattle, pigs, sheep), horses or other animals used for transportation of people and/or goods, other domesticated animals including indoor and/or outdoor pets, and non-domesticated animals such as mice, bird, and/or deer, as may be valuable in supporting further reduction of vector populations.

In some embodiments, patients could be treated with gene therapy (e.g., a viral or plasmid vector) that causes a treated individual to synthesize an isoxazoline parasiticide sufficient to cause natural malaria resistance. In some embodiments, animals including farm animals could be treated with gene therapy (e.g., a viral or plasmid vector) that causes a treated animal to synthesize an isoxazoline parasiticide that can be excreted in milk, etc. sufficient to serve as a bioreactor.

In some embodiments, a formulation and/or packaging can be specifically configured to be tolerant of extreme environmental conditions (e.g., high heat or UV light exposure, for example). The packaging could include opaque or reflective packaging, such as waterproof packaging in some cases. In some embodiments, a flavoring and/or sweetening agent can be added to an oral formulation to improve taste.

In some embodiments, an isoxazoline parasiticide formulation can be utilized to treat other indications/diseases via systems and methods as disclosed elsewhere herein. The diseases could also be spread via an insect vector, such as a mosquito vector. The disease could include, for example, dengue, West Nile virus, chikungya, yellow fever, filiarisis, tularemia, dilofilariasis, Japanese encephalitis, St. Louis encephalitis, Western equine encephalitis, Zika, and the like. In some embodiments, the disease could include, for example, EEE (Eastern Equine Encephalitis) and other tick-borne diseases/pathogens: Lyme disease, Anaplasmosis, Ehrlichiosis, Babesiosis, Borrelia miyamotoi disease, Rickettsia parkeri spotted fever, Pacific Coast tick fever, Ehrlichia muris-like infection, Heartland virus, Bourbon virus, B. mayonii infection, and other tickborne diseases.

In some embodiments, an isoxazoline parasiticide formulation can be utilized to treat other endoparasitic conditions (or protozoan or amebic diseases), including river blindness (onchocerciasis), leishmaniasis, cryptosporidiosis, amoebiasis, Chagas disease, African trypanosomiasis, and others.

In some embodiments, not to be limited by theory, an isoxazoline parasiticide used systemically for malaria treatment or prophylaxis could include any number of the following properties: Mechanism of action can involve one, two, or more of: inhibition or activation of 5HT3 receptors, GABA Cl- channels, glutamate-gated Cl- channels, Serpentine receptors, or depolarization or other neural activity on *Plasmodium* species; Mechanism of action involves blocking nuclear import of the *Plasmodium* signal recognition particle (SRP), or involvement of the farnesoid X receptor for regulation of glucose homeostasis; Inhibits the hepatic stage of *Plasmodium* infection by impairing parasite development inside hepatocytes, and reducing resulting parasitemia, thus reducing disease severity and enhancing patient survival; and/or may be used in combination with an avermectin, e.g., ivermectin and/or other therapeutic agents as discussed herein for activity against *Plasmodium*.

In some embodiments, pharmaceutical formulations and methods as disclosed herein can be used to treat or prevent infection by one, two, or more pathogens, and can have a direct effect on the pathogen (and not just a vector that may be harboring the pathogen). Pathogens can include, for example, any number of the following: viruses (including but not limited to coronavirus, human immunodeficiency virus, herpes simplex virus, papilloma virus, influenza virus, parainfluenza virus, hepatitis virus, Coxsackie Virus, herpes zoster virus, measles virus, mumps virus, rubella, rabies virus, hemorrhagic viral fevers, H1N1, and the like), prions, parasites, fungi, mold, yeast and bacteria (both gram-positive, gram-negative, anaerobic, acid-fast, and the like).

In some embodiments, the pathogen is a virus, e.g., a DNA or RNA virus. In some embodiments, the virus is an RNA virus, e.g., a single or double-stranded virus. In some embodiments, the RNA virus is a positive sense, single-stranded RNA virus. In some embodiments, the virus is part of the Nidovirales order. In some embodiments, the virus belongs to the Coronaviridae family. In some embodiments, the virus belongs to the alphacoronavirus, betacoronavirus, gammacoronavirus or deltacoronavirus genus. In some embodiments, the alphacoronavirus is, without limitation, human coronavirus 229E, human coronavirus NL63 or transmissible gastroenteritis virus (TGEV). In some embodiments, the betacoronavirus is, without limitation, Severe Acute Respiratory Syndrome Coronavirus (SARS-COV), SARS-COV-2 (COVID-19), Middle Eastern Respiratory Syndrome Coronavirus (MERS-COV), human coronavirus HKU1, or human coronavirus OC43. In some embodiments, the gammacoronavirus is infectious bronchitis virus (IBV). In some embodiments, the coronavirus is an animal virus and causes feline intestinal peritonitis (FIP), canine respiratory coronavirus (CRCoV), bovine coronavirus, or equine enteric coronavirus.

The formulations can be administered to, for example, a human and/or other non-human animals such as dogs, cats, livestock, primates, bats, and the like.

Not to be limited by theory, in some embodiments, a pharmaceutical formulation, including but not limited to an isoxazoline parasiticide and/or other therapeutic agents disclosed elsewhere herein, can bind to, inhibit expression of, or otherwise directly or indirectly affect any number of:
- a spike(S) glycoprotein contained on the viral surface;
- the receptor binding domain (RBD) on S1 involved in transmembrane angiotensin-converting enzyme 2 (ACE2) binding;
- ACE2 (angiotensin-converting enzyme 2)—a viral receptor protein on the host cells which binds to viral S protein;
- the angiotensin AT2 receptor;
- the S2 protein (involved in viral fusion with the cell membrane);

an envelope small membrane nucleoprotein (E protein);

a membrane protein (N protein);

3CLpro (coronavirus main protease 3CLpro) and/or PLpro (papain-like protease PLpro)—proteases for the proteolysis of viral polyprotein into functional units;

RdRp (RNA-dependent RNA polymerase for replicating the viral genome);

TMPRSS2 (transmembrane protein, serine 2—a host cell-produced protease that primes S protein to facilitate its binding to ACE2) and/or hemagglutinin esterase (HE), in order to treat or prevent viral infections.

In some embodiments, a formulation, including but not limited to an isoxazoline parasiticide (e.g., for example, fluralaner, sarolaner, lotilaner, afoxolaner, fluxametamide, and isocycloseram) and/or other therapeutic agents disclosed elsewhere herein, can be used as a single active agent, or have unexpectedly synergistic effects when utilized in combination with additional agents, to treat a pathogenic infection, such as a viral infection, including but not limited to SARS-COV 2 (COVID 19) and others. In some embodiments, other forms including those disclosed herein, such as, for example, derivatives, analogues, and l-and d-isomers thereof, including but not limited to enantiomers, compositions comprising racemic mixtures, and enantiomerically pure compositions can also be utilized.

In some embodiments, a formulation, including but not limited to a spinosyn and/or other therapeutic agents disclosed elsewhere herein, can be used as a single active agent, or have unexpectedly synergistic effects when utilized in combination with additional agents to treat a pathogenic infection, such as a viral infection, including but not limited to SARS-COV 2 (COVID 19) and others. The spinosyn could include, for example, spinosyn A, B, C, D, E, F, G, H, J, K, L, M, N, O, P, Q, R, S, T, U, V, W, Y, and the like. Spinosyns are a family of macrocyclic lactones that have pesticidal activity on a variety of pests. The early identified spinosyns were found to have a 5,6,5-tricylic ring system, fused to a 12-membered macrocyclic lactone, a neutral sugar (rhamnose), and an amino sugar (forosamine). Spinosyns are also disclosed in U.S. Pat. Nos. 5,496,931, 5,670,364, 5,591,606, 5,571,901, 5,202,242, 5,767,253, 5,840,861, 5,670,486 and 5,631,155, as well as U.S. Pub. No. 2020/0031859 to Santos et al., each of which are hereby incorporated by reference in their entireties. In some embodiments, other forms including those disclosed herein, such as, for example, derivatives, analogues, and l- and d-isomers thereof, including but not limited to enantiomers, compositions comprising racemic mixtures, and enantiomerically pure compositions can also be utilized.

In some embodiments, a formulation, including but not limited to albendazole, cambendazole, fenbendazole, flubendazole, mebendazole, oxfendazole, parbendazole, tiabendazole, triclabendazole, amitraz, demiditraz, clorsulon, closantel, oxyclozanide, rafoxanide, cyphenothrin, flumethrin, permethrin, promazine, derquantel, diamphenetide, dicyclanil, dinotefuran, imidacloprid, nitenpyram, thiamethoxam, abamectin, doramectin, emamectin, eprinomectin, ivermectin, moxidectin, selamectin, milbemycin oxime, emodepside, epsiprantel, fipronil, fluazuron, fluhexafon, indoxacarb, levamisole, lufenuron, metaflumizone, methoprene, monepantel, morantel, niclosamide, nitroscanate, nitroxynil, novaluron, oxantel, praziquantel, pyrantel, pyriprole, pvriproxyfen, sisapronil, spinosad, spinetoram, lindane, picrotoxin, dieldrin, alpha-endosulfan, and/or triflumezopyrim can be used as a single active agent, or have unexpectedly synergistic effects when utilized in combination with additional agents to treat a pathogenic infection, such as a viral infection, including but not limited to SARS-COV 2 (COVID 19) and others as disclosed elsewhere herein.

In some embodiments, a formulation, including but not limited to a meta- diamide (e.g., broflanilide, tetraniliprole, or cyclaniliprole), a cyclodiene, and/or a macrocyclic lactone (including avermectins and milbemycin); an Alzheimer's disease drug can be the active agent, such as galantamine, donepezil and other piperidine analogues, rivastigmine and other carbamate analogues, tacrine, 7-methoxytacrine, other pyridine analogues, huperzine A and other alkaloid analogues can be used as a single active agent, or have unexpectedly synergistic effects when utilized in combination with additional agents to treat a pathogenic infection, such as a viral infection, including but not limited to SARS-COV 2 (COVID 19) and others.

In some embodiments, a formulation, including but not limited to a formamidine parasiticides can be used as a single active agent, or have unexpectedly synergistic effects when utilized in combination with additional agents to treat a pathogenic infection, such as a viral infection, including but not limited to SARS-COV 2 (COVID 19) and others. A formamidine parasiticide can be, for example, amitraz. N-(2, 4-Dimethylphenyl)-N-methyformamidine (DPMF), a metabolite of amitraz can be another active therapeutic agent, alone or in addition. 2,4-dimethylanaline is a hydrolysis metabolite of DPMF and can also be an active therapeutic agent in other embodiments. In some embodiments, other forms including those disclosed herein, such as, for example, derivatives, analogues, and l-and d-isomers thereof, including but not limited to enantiomers, compositions comprising racemic mixtures, and enantiomerically pure compositions can also be utilized.

In some embodiments, a formulation, including but not limited to a formamidine parasiticides can be used as a single active agent, or have unexpectedly synergistic effects when utilized in combination with additional agents to treat a pathogenic infection, such as a viral infection, including but not limited to SARS-COV 2 (COVID 19) and others. The chemical structures of these insecticides are characterized by a central pyrazole ring with a phenyl group attached to one of the nitrogen atoms of the pyrazole. Some non-limiting examples of phenyl pyrazole parasiticides include, for example, acetoprole, ethiprole, fipronil, flufiprole, pyraclofos, pyrafluprole, pyriprole, pyrolan, and vaniliprole.

In some embodiments, a formulation, including but not limited to organophosphates, can be used as a single active agent, or have unexpectedly synergistic effects when utilized in combination with additional agents to treat a pathogenic infection, such as a viral infection, including but not limited to SARS-COV 2 (COVID 19) and others. The organophosphate could include one or more of, for example, acephate, azamethiphos, azinphos ethyl, azinphos methyl, bromophos, bromophos ethyl, cadusafos, carbophenothion, chlormephos, chlorphoxim, chlorpyrifos, chlorpyrifos-methyl, chlorthiophos, chlorvinphos, coumaphos, crotoxyphos, crufomate, cyanofenphos, cyanophos, demephron-O, demephron-S, demeton-O, demeton-S, demeton-S-methyl, demeton-S-methyl sulphone, dialifos, diazinon, dichlofenthion, dichlorvos, dicrotophos, dimefox, dimethoate, dioxabenzofos, dioxathion, disulfoton, ditalimfos, edifenphos, EPBP, EPN, ESP, ethion, ethoprophos, etrimfos, famphur, fenamiphos, fenchlorphos, fenitrothion, fensulfothion, fenthion, fenofos, formothion, fosmethilan, heptenophos, isazofos, isofenphos, isothioate, isoxathion, iodofenphos, leptophos, metrifonate, malathion, menazon, mephosfolan, methacrifos, methamidophos, methidathion, mevinphos, monocrotophos, naled, omethoate, oxydemeton-methyl, parathion, parathion-methyl, phenthoate, phorate, phosalone, phosmet, phosphamidon, phosphamidon amide, phospholan, phoxim, pirimiphos-ethyl, pirimiphos-methyl, profenofos, propaphos, propetamphos, prothiofos, prothoate, pyraclofos, pyridaphenthion, quinalphos, schradan, sulfotep, sulprofos, temephos, TEPP, terbufos, tetrachlorvinphos, thiometon, thionazin, triazophos, trichlorfon, vamidothion, a prodrug of these and a pharmaceutically acceptable salt or ester of these. In some embodiments, the organophosphate can be dichlorvos or a prodrug or pharmaceutically acceptable salt or ester thereof. In some embodiments, the organophosphate can be metrifonate or a prodrug or pharmaceutically acceptable salt or ester thereof. In some embodiments, other forms including those disclosed herein, such as, for example, derivatives, analogues, and l- and d-isomers thereof, including but not limited to enantiomers, compositions comprising racemic mixtures, and enantiomerically pure compositions can also be utilized.

The additional agent could be, for example, other agents with anti-viral activity, including but not limited to baricitinib or other JAK inhibitors; lopinavir and/or ritonavir, darunavir, favipiravir, remdesivir, ribavirin, galidesivir, BCX-4430 (salt form of galidesivir), Arbidol, chloroquine, hydroxychloroquine, mefloquine, nitazoxanide, acyclovir, famciclovir, ganciclovir, foscarnet, idoxuridine, sorivudine, trifluorothymidine, valacyclovir, vidarabine, didanosine, dideoxyinosine, stavudine, zalcitabine, zidovudine, amantadine, interferon alpha, rimantadine, oseltamivir, zanamivir, and/or baloxavir, as well as other agents as disclosed elsewhere herein.

In some embodiments, the therapeutic agent is provided in a single, one- time low dose given at some interval (e.g., monthly or longer), including but not limited to every 2-3 weeks, 1, 2, 3, 4, 5, 6 months, or more or less, or ranges including any of the foregoing values. In some embodiments, administration once every 3-4 months could ultimately mean once per year for places with seasonal pathogen transmission. In some embodiments, the formulation or method results in a peak or random blood, plasma, serum, or other fluid level in the patient of isoxazoline parasiticide, or other therapeutic agent including those disclosed elsewhere herein that is no more than about 1,000, 750, 500, 250, 200, 175, 150, 125, 100, 75, 50, 25, 20, 15, 10, 5, 4, 3, 2, 1 ng/ml or even less. In some embodiments, a single dose, or multiple doses can be provided, each dose of the formulation with a half-life of about or at least about 20, 25, 30, 35, 40, 45, 50, 55, 60, or more days. In some cases, such long-acting dosing can have several advantages over alternative potential drugs for transmission prophylaxis or prolonged treatment effect, decreasing viral loads or preventing secondary complications such as pneumonia, acute respiratory distress syndrome (ARDS), septic shock, cardiomyopathy, renal failure, etc.; given the relatively long half-life. However, in some embodiments, dosing could be, for example, about or at least about 1, 2, 3, 4, 5, 6, 7, 8, or more times daily, such as 1 to 2 times daily. In some embodiments, therapy could also be weekly, single dose or a limited-course of treatment.

In some embodiments, the dosing can be more than a single oral dose over a 45, 60, 75, 90, or more day period, such as at least about 2, 3, 4, 5, 6, 7, or more doses. The doses can be, for example, 1, 2, 3, 4, 5, 6 or more times weekly, or 1, 2, 3, or more times daily, for example. In some embodiments, the cumulative dosing of an active agent, such as for example, an isoxazoline parasiticides or any other agent as disclosed herein administered in a course of treatment can be about, at least about, or no more than about 50 mg, 100 mg, 200 mg, 300 mg, 400 mg, 500 mg, 1 g, 1.5 g, 2 g, 3 g, 4 g, 5 g, 6 g, 7 g, 8 g, 9 g, 10 g, or more divided over a period of at least about 1 day, 2 days, 3 days, 4 days, 5 days, 6 days, 7 days, 2 weeks, 3 weeks, 4 weeks, 45, 60, 75, 90, or more days. In some embodiments, the dosage can be more than a single oral dose, of which the dosages may be different amounts. In some embodiments, the viral load of an individual can be decreased by at least 10%, 20%, 30%, 40%, 50%, 60%, 70%, 80%, 90% or more, 1, 2, 3, 4, 5, 6, 7, 10, 14, or more days after therapy relative to prior to the initiation of therapy.

In some embodiments, an active agent, such as for example, an isoxazoline parasiticides or any other agent or combination of agents as disclosed herein can be administered to create peak, trough, or random plasma concentrations over 1, 2, 3, 4, 5, 6, 7, or more days, for example, between about 1 ng/mL and about 50,000 ng/ml, between about 10 ng/mL and about 10,000 ng/mL, between about 100 ng/mL and about 5,000 ng/mL, about, at least about, or no more than about 1, 5, 10, 50, 100, 500, 1,000, 5,000, 10,000, 25,000, or 50,000 ng/mL, or ranges including any two of the foregoing values. In some embodiments, the isoxazoline parasiticide can be administered to create peak, trough, or random plasma concentrations over 1, 2, 3, 4, 5, 6, 7, or more days, for example, between about 1 nM and about 50,000 nM, between about 10 nM and about 10,000 nM, between about 100 nM and about 5,000 nM, about, at least about, or no more than about 1, 5, 10, 50, 100, 200, 250, 300, 350, 400, 450, 500, 600, 700, 800, 900, 1,000, 5,000, 10,000, 25,000, or 50,000 nM, or ranges including any two of the foregoing values. In some embodiments, the active agent, such as, for example, an isoxazoline parasiticide can be administered in such a way to create a long-acting (for example, 1, 2, 3, 4, 5, 6, 7, or more days, 2, 3, 4, or more weeks, 2, 3, 4, 5, 6, or more months, or more or less) and relatively constant blood plasma exposure. As a non-limiting example, the active agent, e.g, isoxazoline parasiticide could be delivered via solid oral tablets once per week over a three-week interval with no further therapy with the parasiticides within about 1, 2, 3, 4, 5, 6 months or more or less thereafter, wherein each tablet systemically delivers isooxazoline so as to maintain relatively constant blood plasma levels (e.g., variation of less than about 10%, or less than about 20%) over a period of about 1, 2, 3, 4, 5, 6 months or more or less, or ranges including any two of the foregoing values.

In some embodiments, an active agent, for example, an isoxazoline parasiticide formulation or any other agent or combination of agents as disclosed herein can be delivered orally (e.g., in tablet, chew, capsule, syrup, sublingual, dispersible, crushable, dissolvable, or other formulation), via injection (e.g., intramuscular, subcutaneous, intravenous, intraosseus), transdermally (e.g., via a patch, cream, ointment, oil, etc.), via an oral or nasal spray, via a transrectal or transvaginal suppository, an eye drop formulation at a dose sufficient for therapeutically effective systemic bioavailability, and the like. In some embodiments, the isoxazoline parasiticide may be administered in more than one format or administration route to achieve some desirable effect, for example, as both an oral tablet and dermal application.

In some embodiments, an active agent, for example, an isoxazoline parasiticide formulation or any other agent or combination of agents as disclosed herein can be given in individual doses of, for example, about, at least about, or no more than about 1 mg, 2 mg, 3 mg, 4 mg, 5 mg, 10 mg, 20 mg, 30 mg, 40 mg, 50 mg, 60 mg, 70 mg, 80 mg, 90 mg, 100 mg, 150 mg, 200 mg, 250 mg, 300 mg, 350 mg, 400 mg, 450 mg, 500 mg, 550 mg, 600 mg, 650 mg, 700 mg, 750 mg, 800 mg, 850 mg, 900 mg, 950 mg, 1000 mg, 1250 mg, 1500 mg, 1750 mg, 2000 mg, 2500 mg, 3000 mg, 4000 mg, 5000 mg, or more or less, or ranges including any two of the foregoing values. The dosing could be at least about, about, or no more than about 1, 2, or 3 times a day; every other day, every third day, 1, 2, 3, 4, 5, 6, or 7 times a week; once every 2 weeks, once a month, once every two months, once every three months, a single one-time dose only, or ranges including any two of the foregoing values. The therapeutic regimen can be administered for a total of about, at least about, or no more than about 1, 2, 3, 4, 5, 6, 7, 8, 9, 10, 11, 12, 13, 14, 21, 28 days, or more or less, or ranges including any two of the foregoing values.

Various other modifications, adaptations and alternative designs are of course possible in light of the above teachings. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications and alternative forms, specific examples thereof are herein described in detail. It should be understood, however, that the invention is not to be limited to the particular forms or methods disclosed, but to the contrary, the invention is to cover all modifications, equivalents and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "orally administering an isoxazoline parasiticide pharmaceutical formulation" includes "instructing the oral administration of an isoxazoline parasiticide pharmaceutical formulation." The ranges disclosed herein also encompass any and all overlap, sub-ranges and combinations thereof. Language such as "up to," "at least," "greater than," "less than," "between," and the like includes the number recited. Numbers preceded by a term such as "approximately," "about," and "substantially" as used herein include the recited numbers (e.g., about 10%=10%) and also represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of and within less than 0.01% of the stated amount.

What is claimed is:

1. A method of killing one or more ticks that attach to a human, comprising:
   administering a first oral dose of a composition comprising lotilaner to a human at a first time point; and
   administering a second oral dose of a composition comprising lotilaner to the human at a second time point,
   wherein the first oral dose is between about 50 mg and about 400 mg of lotilaner,
   wherein the second oral dose is between about 30 mg and about 100 mg of lotilaner, and
   wherein the second time point is about 1 month after the first time point.

2. The method of claim 1, sufficient to kill one or more ticks if one or more ticks attach to the human within about 1 month after the first time point.

3. The method of claim 2, sufficient to kill one or more ticks if the one or more ticks attach to the human within about 3 months after the first time point.

4. The method of claim 1, wherein lotilaner is the sole active ingredient in the composition.

5. The method of claim 1, wherein the one or more ticks are from the group consisting of an Ixodes tick, an Amblyomma tick, a Dermacentor tick, a Rhipicephalus tick, and an Ornithodoros tick.

6. The method of claim 5, wherein the one or more ticks include an Ixodes tick.

7. The method of claim 1, sufficient to prevent transmission of a tick-borne disease via tick kill, wherein the tick-borne disease is selected from the group consisting of: tularemia, Lyme disease, anaplasmosis, ehrlichiosis, *ehrlichia muris*-like infection, babesiosis, Borrelia miyamotoi disease, B. mayonii infection, *Rickettsia parkeri* spotted fever, R. parkeri rickettsiosis, Pacific Coast tick fever, tick-borne relapsing fever, Rocky Mountain spotted fever, Colorado tick fever, Powassan virus disease, Heartland virus disease, Bourbon virus disease, and Southern tick-associated rash illness.

8. The method of claim 7, wherein the tick-borne disease is Lyme disease.

9. The method of claim 7, wherein the tick-borne disease is babesiosis.

10. The method of claim 7, wherein the tick-borne disease is anaplasmosis.

11. The method of claim 1, further comprising administering additional oral doses of a composition comprising lotilaner to the individual at additional time points, wherein the additional oral doses are between about 30 mg and about 100 mg of lotilaner, and wherein the additional time points are about 1 month after a preceding time point.

12. The method of claim 11, wherein the first oral dose is about 400 mg of lotilaner, and wherein the second oral dose and the additional oral doses are between about 40 mg and about 100 mg of lotilaner.

13. The method of claim 12, wherein the first oral dose is about 400 mg of lotilaner, and wherein the second oral dose and the additional oral doses are about 100 mg of lotilaner.

14. The method of claim 11, wherein the first oral dose is about 300 mg of lotilaner, and wherein the second oral dose and the additional oral doses are between about 40 mg and about 60 mg of lotilaner.

15. The method of claim 11, wherein the first oral dose is about 250 mg of lotilaner, and wherein the second oral dose and the additional oral doses are between about 50 mg and about 80 mg of lotilaner.

16. The method of claim 15, wherein the first oral dose is about 250 mg of lotilaner, and wherein the second oral dose and the additional oral doses are about 50 mg of lotilaner.

17. The method of claim 11, wherein the first oral dose is between about 100 mg and about 400 mg of lotilaner, and wherein the second oral dose and the additional oral doses are about 100 mg of lotilaner.

18. The method of claim 17, wherein the first oral dose is about 100 mg of lotilaner, and wherein the second oral dose and the additional oral doses are about 100 mg of lotilaner.

19. The method of claim 11, wherein the first oral dose is about 75 mg of lotilaner, and wherein the second oral dose and the additional oral doses are about 75 mg of lotilaner.

20. A method of killing one or more ticks that attach to a human, comprising:
    orally administering a composition comprising between about 100 mg and about 400 mg of lotilaner to a human at a first time point; and
    orally administering a composition comprising between about 25 mg and about 100 mg of lotilaner to the human at one or more additional time points,
    wherein the amount of lotilaner administered at the one or more additional time points is less than 50% of the amount of lotilaner administered at the first time point, and
    wherein the first time point and the one or more additional time points are each about 1 month apart.

21. The method of claim 20, wherein the one or more additional time points comprise two to 11 additional time points.

22. The method of claim 21, wherein the amount of lotilaner to be administered to the human is about the same at each of the two to 11 additional time points.

23. The method of claim 20, wherein the one or more additional time points comprise six to ten additional time points.

24. The method of claim 20, wherein lotilaner is the sole active ingredient in the composition.

25. The method of claim 20, wherein the one or more ticks are from the group consisting of an Ixodes tick, an Amblyomma tick, a Dermacentor tick, a Rhipicephalus tick, and an Ornithodoros tick.

26. The method of claim 20, wherein the composition comprising between about 100 mg and about 400 mg of lotilaner is a composition comprising between about 200 mg and about 300 mg of lotilaner.

27. The method of claim 20, wherein the composition comprising between about 100 mg and about 400 mg of lotilaner is a composition comprising about 250 mg of lotilaner.

28. The method of claim 20, wherein the composition comprising between about 25 mg and about 100 mg of lotilaner is a composition comprising between about 40 mg and about 60 mg of lotilaner.

29. The method of claim 20, wherein the composition comprising between about 25 mg and about 100 mg of lotilaner is a composition comprising between about 60 mg and about 100 mg of lotilaner.

* * * * *